US010216297B2

(12) United States Patent
Bentsen et al.

(10) Patent No.: US 10,216,297 B2
(45) Date of Patent: *Feb. 26, 2019

(54) UNIVERSAL USER INTERFACE DEVICE

(71) Applicant: MICROSOFT TECHNOLOGY LICENSING, LLC, Redmond, WA (US)

(72) Inventors: Brett Allen Bentsen, Bellevue, WA (US); Dennis Edward Flanagan, Bellevue, WA (US); Gregory Sean Cox, Kirkland, WA (US); Thamer A. Abanami, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 291 days.

This patent is subject to a terminal disclaimer.

(21) Appl. No.: 14/495,500

(22) Filed: Sep. 24, 2014

(65) Prior Publication Data

US 2015/0009148 A1 Jan. 8, 2015

Related U.S. Application Data

(63) Continuation of application No. 11/402,185, filed on Apr. 10, 2006, now Pat. No. 8,866,750.

(51) Int. Cl.
*G09G 5/00* (2006.01)
*G06F 3/0354* (2013.01)
*G06F 3/044* (2006.01)

(52) U.S. Cl.
CPC ...... *G06F 3/03549* (2013.01); *G06F 3/03547* (2013.01); *G06F 3/044* (2013.01); *G06F 2203/04105* (2013.01)

(58) Field of Classification Search
CPC .............. G06F 3/03547; G06F 2203/04105
USPC ..................... 345/173, 174, 179
See application file for complete search history.

(56) References Cited

U.S. PATENT DOCUMENTS

| 6,118,435 A | 9/2000 | Fujita et al. | |
|---|---|---|---|
| 6,424,338 B1* | 7/2002 | Anderson | G06F 3/0213 178/18.01 |
| 7,499,040 B2* | 3/2009 | Zadesky | G06F 3/0338 345/173 |
| 7,903,090 B2 | 3/2011 | Soss et al. | |
| 2002/0065054 A1 | 5/2002 | Humphreys et al. | |
| 2002/0101458 A1 | 8/2002 | SanGiovanni | |
| 2003/0043123 A1 | 3/2003 | Hinckley et al. | |

(Continued)

FOREIGN PATENT DOCUMENTS

GB 2402105 A 12/2004

*Primary Examiner* — Towfiq Elahi
(74) *Attorney, Agent, or Firm* — Holzer Patel Drennan

(57) ABSTRACT

A flexible, scalable hardware input device for interacting with a variety of devices ranging from a phone, to a media playback device to a steering wheel or a tablet PC is provided. The input device includes a set of mechanical input controls, each mapping to one or more independent functions and a set of touch sensitive input control areas (e.g., capacitive), where each touch sensitive input control area receives touch input independently. In addition, one or more of the touch sensitive input control areas interchangeably overlay one or more of the mechanical input controls, whereby interaction with the touch sensitive input control areas is processed together to determine a corresponding function for controlling the application, service or computing device.

23 Claims, 22 Drawing Sheets

(56) References Cited

U.S. PATENT DOCUMENTS

| | | |
|---|---|---|
| 2003/0166405 A1* | 9/2003 | Jauk ................... H04M 1/22 |
| | | 455/466 |
| 2005/0062732 A1 | 3/2005 | Sinclair et al. |
| 2005/0110768 A1* | 5/2005 | Marriott ............ G06F 3/03547 |
| | | 345/173 |
| 2005/0140657 A1 | 6/2005 | Park et al. |
| 2005/0240983 A1 | 10/2005 | Peters |
| 2006/0025108 A1 | 2/2006 | Pell et al. |
| 2008/0018615 A1 | 1/2008 | Zadesky et al. |
| 2010/0130285 A1 | 5/2010 | Luciano et al. |

* cited by examiner

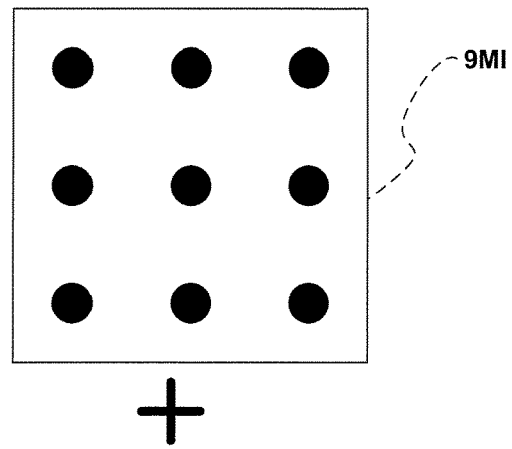
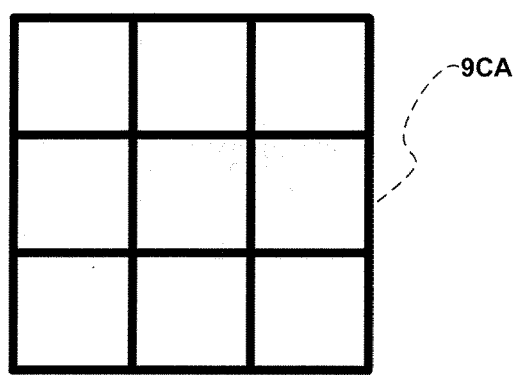
FIG. 1
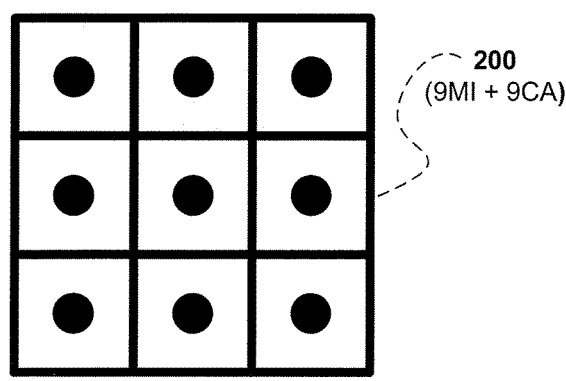

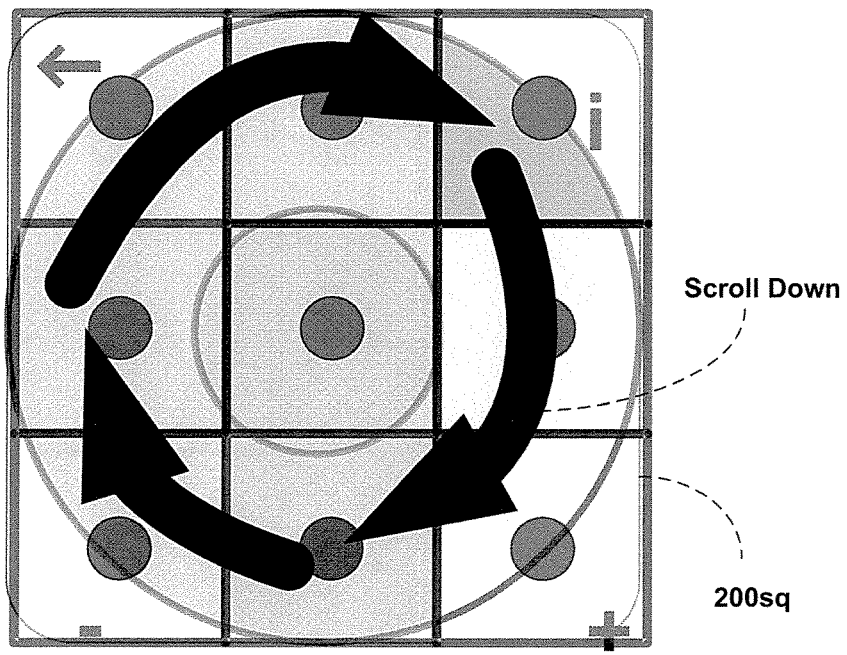
FIG. 3B
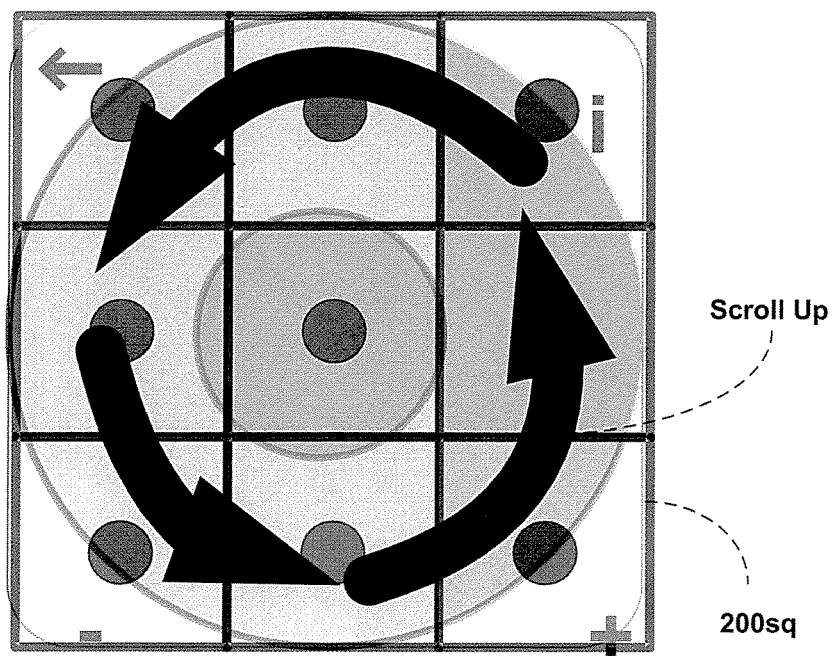

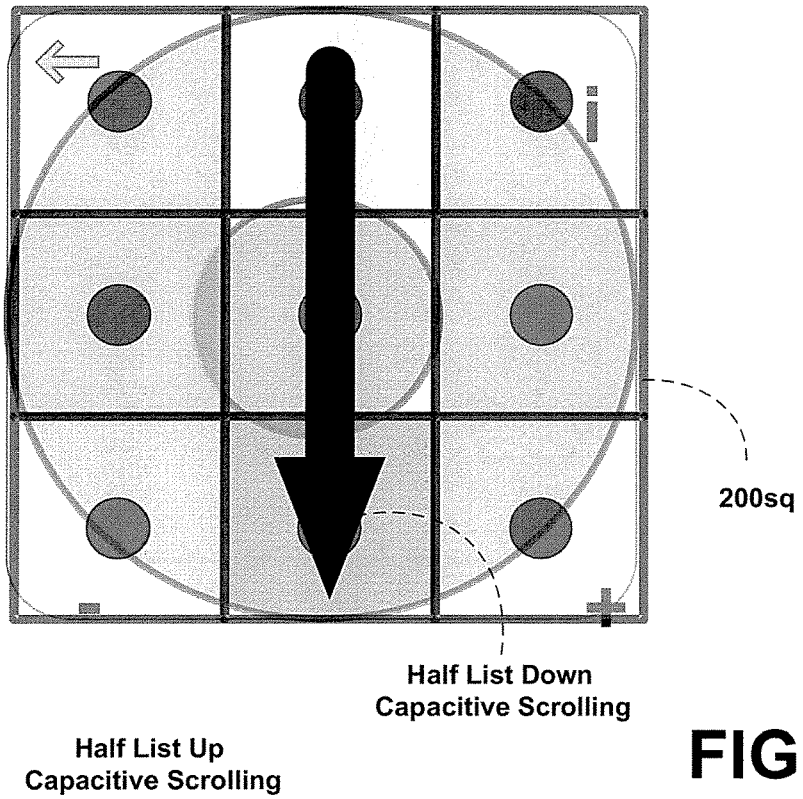
Half List Down
Capacitive Scrolling
FIG. 3C
Half List Up
Capacitive Scrolling
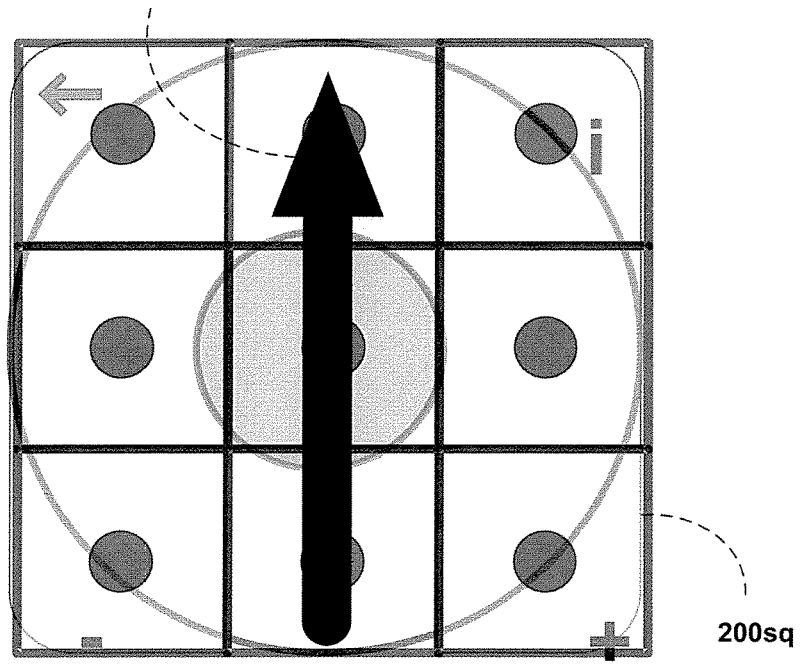

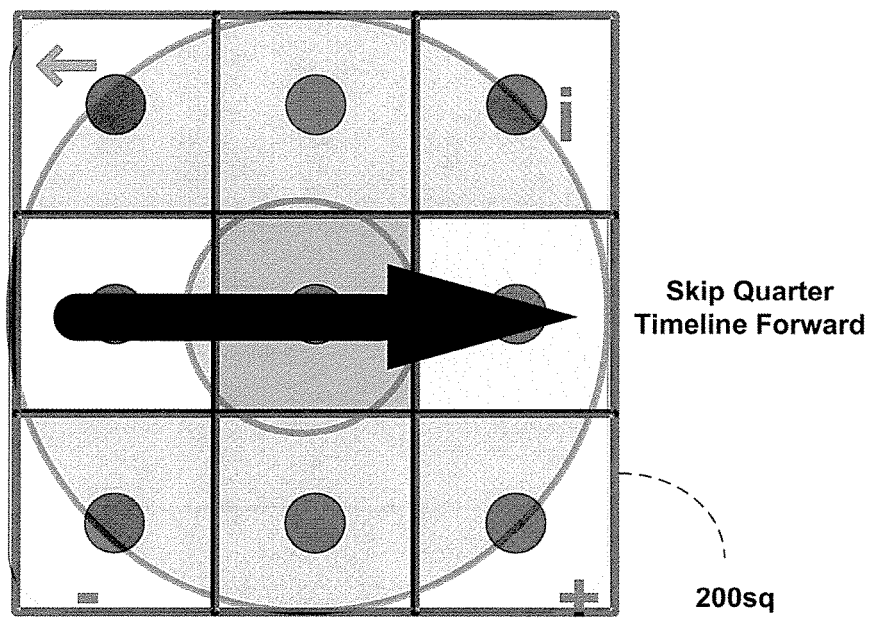
FIG. 3D
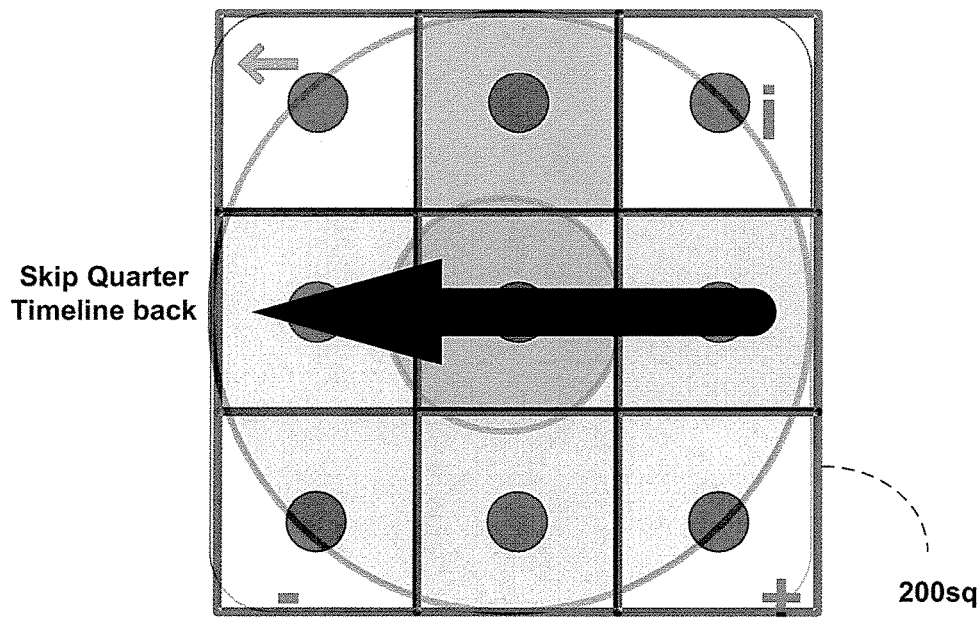

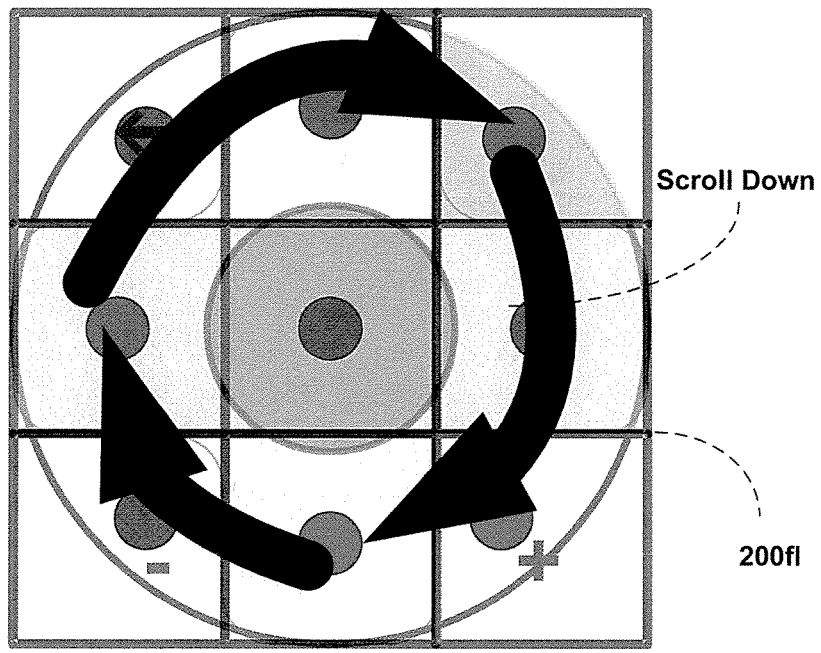
FIG. 4B
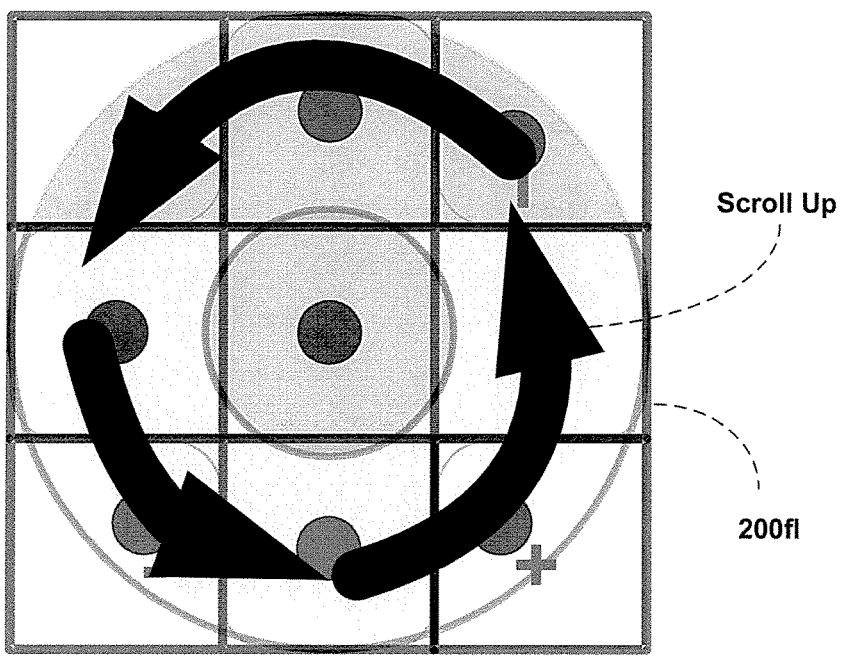

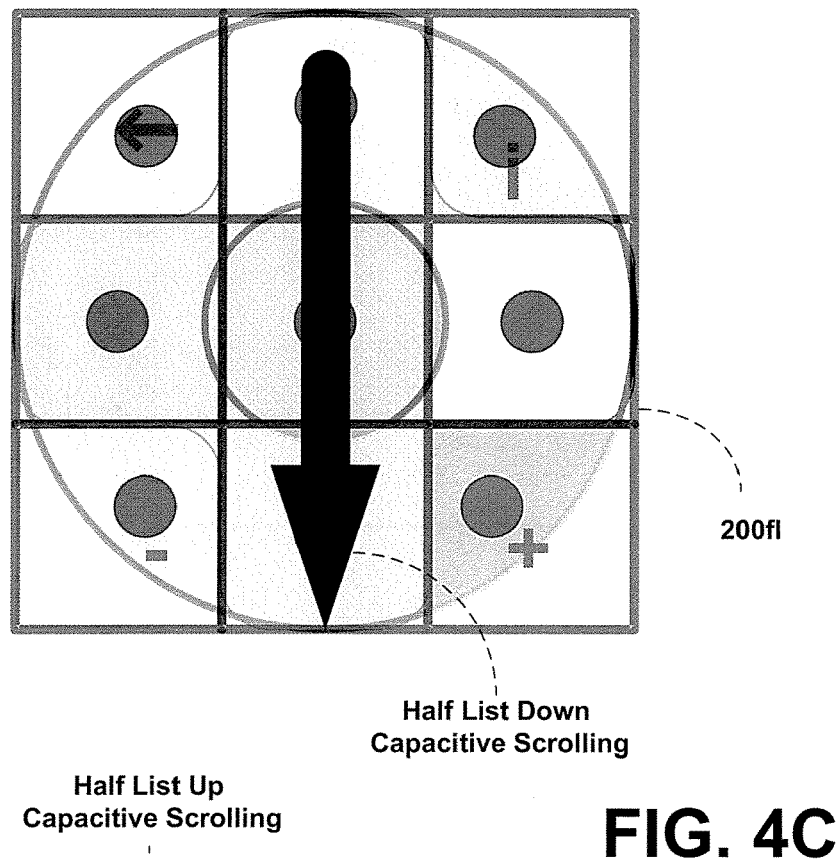
Half List Down
Capacitive Scrolling
FIG. 4C
Half List Up
Capacitive Scrolling
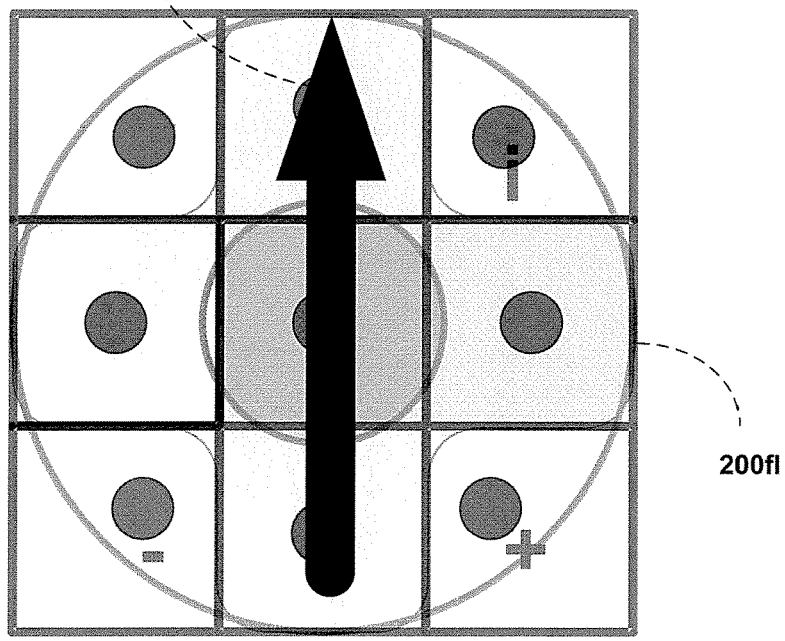

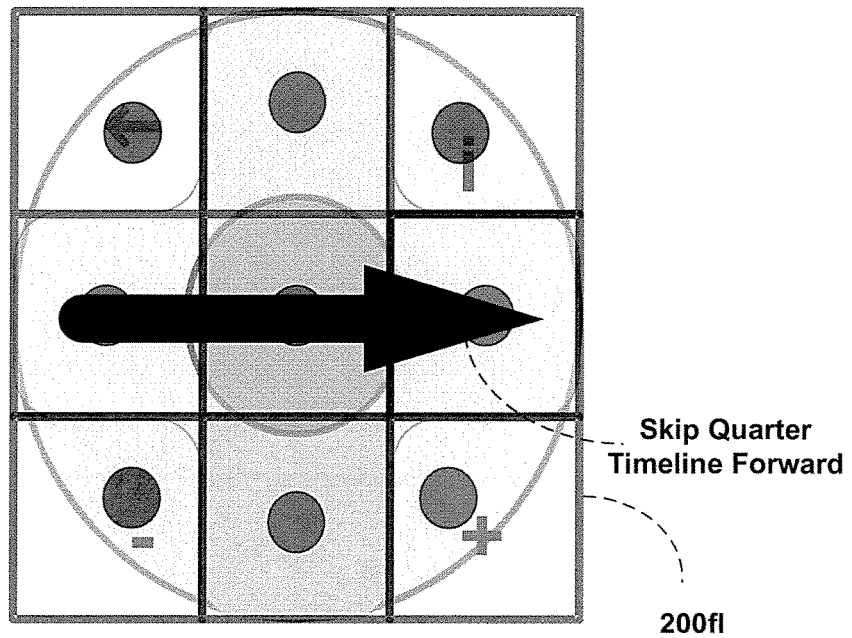
FIG. 4D
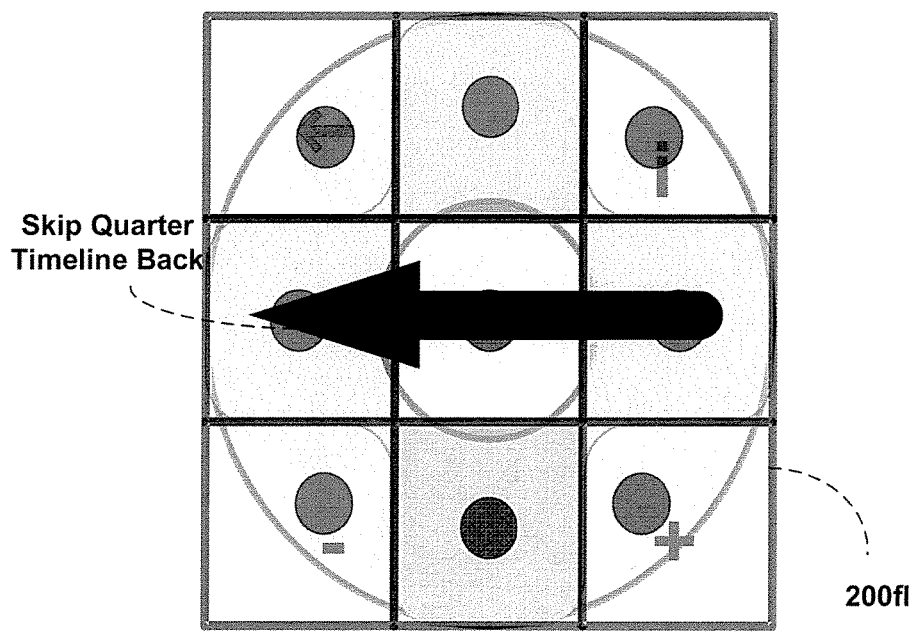

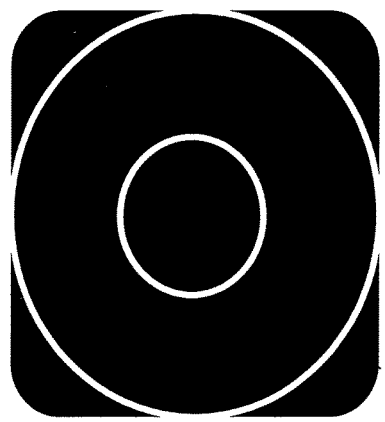
FIG. 5A  200sq
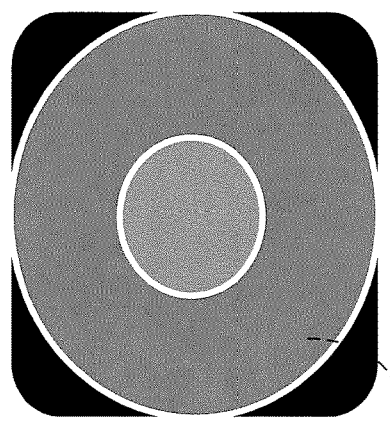
FIG. 5B  200sq
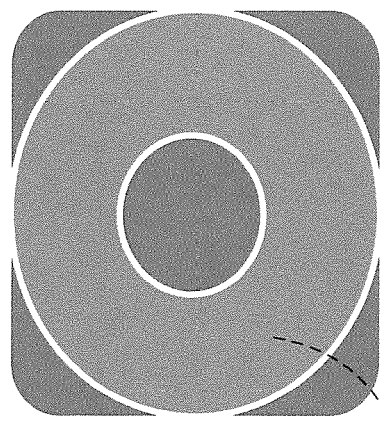
FIG. 5C  200sq

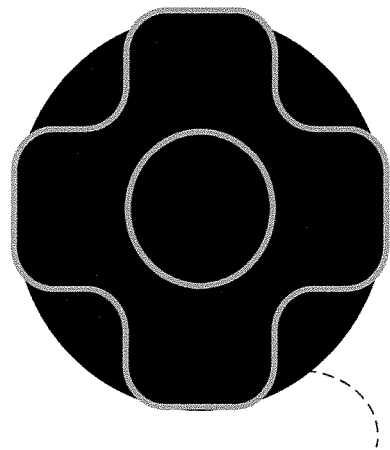
FIG. 5D 200fl
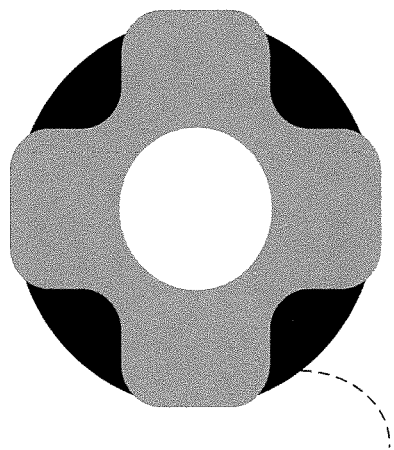
FIG. 5E 200fl
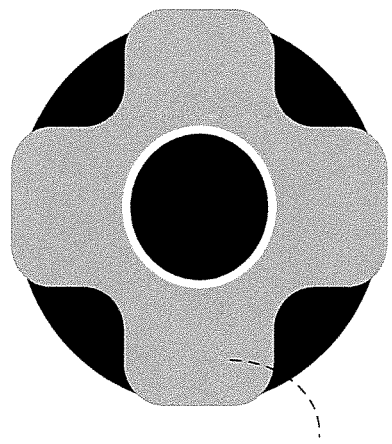
FIG. 5F 200fl

UNIVERSAL USER INTERFACE DEVICE

CROSS REFERENCE TO RELATED APPLICATIONS

This application is a continuation of, and claims priority to, U.S. patent application Ser. No. 11/402,185, filed Apr. 10, 2006. U.S. patent application Ser. No. 11/402,185 is incorporated by reference herein in its entirety.

TECHNICAL FIELD

The present invention relates to a universal user interface. More particularly, the invention relates to a universal set of controls for interfacing to one or more functions of an application, device or service in a computing environment.

BACKGROUND

Today, user interfaces for hardware devices such as laptops, portable media players, as well as user interfaces for remote control devices and many other devices are challenged with achieving a sleek and desirable "look and feel" and industrial design while simultaneously addressing the growing requirements to take multiple types of hardware input—in order to interact with the increasingly powerful and complex software residing on these devices. Two common kinds of hardware input commonly deployed for user interfaces on computing devices, such as portable media players and remote control devices, include mechanical switches and touch sensitive sensors.

Mechanical switches, such as toggle switches, throw switches, dial switches, slide switches, etc. are termed "mechanical" because they have moving parts which engage or disengage electrical connection(s) to produce a desired result. Mechanical buttons provide a good example of mechanical switches used for input devices. As a common "on/off" scenario for a mechanical button, when the mechanical button is pressed and thus physically moved, a connection becomes engaged, producing a desired result such as "device on." Then, when the button is released (or pressed again, or moved the other direction, etc.), the connection is disengaged, producing another desired result such as "device off." In this regard, the device responds to the actuation of the mechanical switches according to predetermined functionality assigned to the mechanical switches. Mechanical switches also have tactile benefits because their actuation is perceptible to the sense of touch, i.e., there is tangible (mechanical) feedback to a user that actuation has occurred.

Another kind of input includes touch sensitive user interfaces that operate in response to sensors that detect touch by the user. For instance, capacitive touch pads are an example of a touch sensitive user interface that operate by sensing capacitance between sensors, in this case, measuring the capacitance of a user's finger (more accurately, the user's whole arm) in contact with the touchpad. Typically, capacitive sensors are laid out along horizontal and vertical axes of the touchpad and the location of the user's finger is determined from the capacitance measured by the capacitive sensors.

Some touchpads also have "hotspots," which are locations on the touchpad that indicate user intentions other than some primary functionality. For example, on certain touchpads, moving one's finger along the right edge of the touch pad will control the scrollbar and vertically scroll the current window. Similarly, moving the finger on the bottom of the touchpad can scroll a window in the horizontal direction. Some touchpads can also emulate multiple mouse buttons by either tapping in a special corner of the pad, or by tapping with two or more fingers.

Today, touchpads are primarily found in portable laptop computers, because alternative mouse devices require a flat table adjacent to use of the device. Touchpads can be advantageous because short finger movements can be used to move the cursor adequately across the display screen, i.e., some users prefer the compact movement to the movement of a mouse device.

Some applications come ready with their own software or hardware user interfaces. For instance, application software for a PC may traditionally take mouse and keyboard input, which is standard for software on a PC platform. However, there is no standard hardware user interface that can replace such input as part of a 10 foot living room experience, as a remote control, for instance. For example, as the TV and PC continue to converge, it would be desirable to have an alternative input to the PC that is a de facto industry standard across devices with which users will be familiar, because it is employable for everything from kitchen appliances, to media players, to consumer electronics. Thus, there is a need for a standard, or universal, method for controlling user interfaces via a hardware input device with which users can immediately identify.

Given that such standard hardware input would be designed for users and applications of all types, it would be desirable to provide a standard input device that is simple, approachable and forgiving for users at all levels. Moreover, such standard hardware input should enable the user to navigate collections of media and execute transport controls with a single hand, regardless of the device or service serving up the media being rendered. With a standard hardware input set of core controls, it would be further desirable to enable blind control at least for volume, play/pause, next/fast forward and previous/rewind, optionally enabling one finger (e.g., the thumb) input. It would be still further desirable for such device to support circular input for scrolling vertical lists, while also enabling "surprise" additional functionality that are optional, but can be used for specialized functionality for the underlying device or application being controlled. Finally, it would be desirable to enable opportunities for customization and personalization of such hardware input device, by allowing for substitutable input layers so that the hardware input device can be customized for a user's preferences or for the underlying tasks to be performed.

SUMMARY

In various embodiments, a flexible, scalable hardware input device for interacting with a variety of devices ranging from a phone, to a media playback device to a steering wheel or a tablet PC is provided. In various non-limiting embodiments, a user interface component for controlling an application, service or computing device is provided that includes a set of mechanical input controls areas, each mapping to one or more independent function and a set of touch sensitive input control areas (e.g., capacitive), where each touch sensitive input control area receives touch input independently. In addition, one or more of the touch sensitive input control areas interchangeably overlay one or more of the mechanical input controls, whereby interaction with the touch sensitive input control areas is processed together to determine a corresponding function for controlling the application, service or computing device.

In a non-limiting embodiment, the invention is a user interface component for controlling an application, service or computing device including a first layer and a second layer. The first layer includes a set of mechanical input controls actuatable by the user to provide a first set of input functionality for controlling the application, service or computing device. The second layer includes a set of touch sensitive input control areas, with each touch sensitive input control area including at least one touch sensitive sensor, wherein each touch sensitive input control area receives touch input independently from each of the other touch sensitive input control areas. At least one of the touch sensitive input control areas overlays at least one of mechanical input control areas, and interaction with the plurality of independent touch sensitive input controls is processed in a combined manner by underlying software in order to determine a corresponding function for controlling the application, service or computing device.

Other features of the present invention are described below.

BRIEF DESCRIPTION OF THE DRAWINGS

The universal hardware input device(s) of the invention are further described with reference to the accompanying drawings in which:

FIG. 1 illustrates the overlay of a set of touch sensitive input areas on a set of mechanical switches in accordance with an aspect of the invention;

FIGS. 3A, 3B, 3C, and 3D demonstrate a first set of illustrative embodiments of a user interface substantially in the shape of a square in accordance with the invention;

FIGS. 4A, 4B, 4C, and 4D demonstrate a second set of illustrative embodiments of a user interface substantially in the shape of a flower in accordance with the invention;

FIGS. 5A, 5B, and 5C illustrate exemplary customizable aspects of the first set of illustrative embodiments of the user interface substantially in the shape of a square in accordance with the invention;

FIGS. 5D, 5E, and 5F illustrate exemplary customizable aspects of the second set of illustrative embodiments of the user interface substantially in the shape of a flower in accordance with the invention;

DETAILED DESCRIPTION OF ILLUSTRATIVE EMBODIMENTS

Figure 2A:
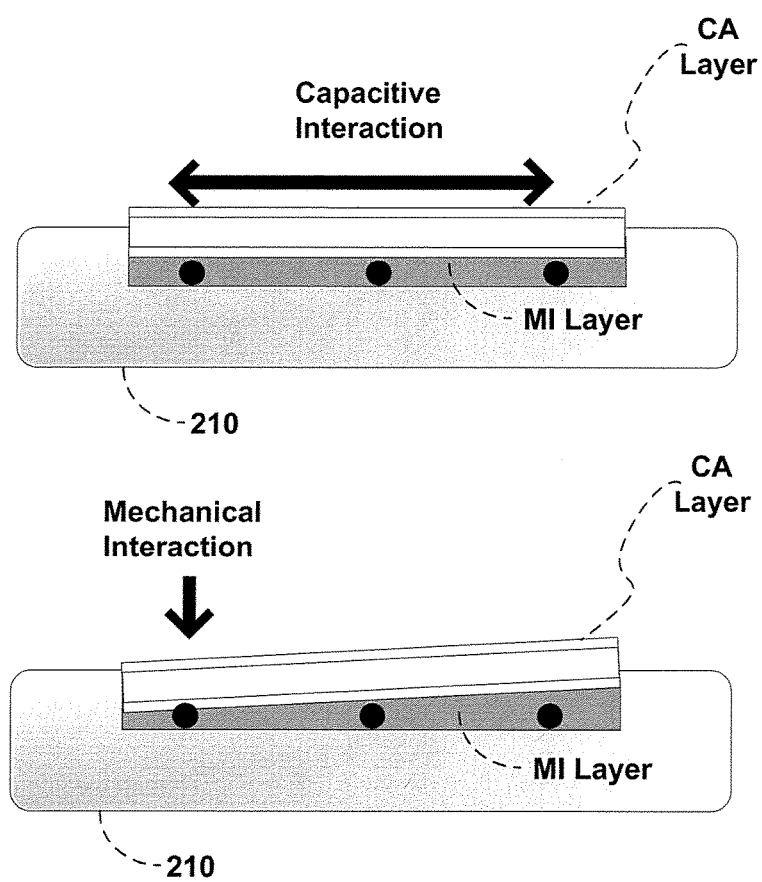
FIGS. 2A and 2B illustrate exemplary aspects of a user interface in accordance with the invention in which a set of touch sensitive input areas overlay a set of mechanical switches.

As mentioned in the background, current hardware user interfaces for computing devices, remote controls, portable devices, and the like are inadequate to handle the ever evolving diverse functionality of the underlying devices they control. In consideration of the state of the art, the invention combines several types of user input devices into more simplified integrated designs.

In this regard, the status quo for user interface devices does not offer enough precision and speed. Thus, the invention provides various embodiments for a universal user interface including a gesture set that is simple and optional. In one non-limiting embodiment, the gesture set adds media and list jumping to linear accelerated media navigation and list navigation. The user interface of the invention is advantageous because it utilizes multiple capacitive surfaces and different control mappings for additional flexibility.

In various embodiments, the invention includes a controller with a set of multiple mechanical switches or areas and a set of multiple capacitive areas, some or all of which can be over the mechanical switches or areas. In various non-limiting embodiments described in more detail below, the invention provides a 3×3 set of unique mechanical inputs, i.e., the mechanical inputs are arranged as three rows of 3 mechanical inputs, or 3 columns of 3 mechanical inputs. In addition, the controller of the invention in such embodiments also includes a set of 3×3 capacitive surfaces over the mechanical switches/areas. For the avoidance of doubt, the invention is not limited to a set of 3×3 touch sensitive inputs overlaying a set of 3×3 mechanical inputs, or even to any particular N×N set of inputs, but rather contemplates any plurality of touch sensitive control areas and any plurality of mechanical control inputs, wherein at least one touch sensitive control area overlays (i.e., is on top of) a mechanical control input. For instance, the invention contemplates 4×3 input arrays, 4×4 input arrays, 4×5 input arrays, and so on, as well as any non-array configurations of the plurality of control areas/inputs, which may take on regular (polygonal, circular, etc.) or irregular shapes (e.g., amorphous).

Any of the embodiments of the invention may optionally include a surface topography change hinting at how to use the capacitive surfaces. For example, the surface topography can be a subtle indented or curved topography, e.g., a bowl. In this regard, because the capacitive areas are each separate from an input standpoint, i.e., the sensors of a first capacitive area operate independently of a second capacitive area, any arbitrary input stroke, and shape, can be supported in the capacitive layer because the underlying software that integrates the reception of input from the mechanical switches and capacitive areas can process all of the input to determine the intended input from the user. For instance, one can imagine a simple zig-zag input stroke that can be detected by the underlying software that enables a unique operation. In this sense, the kinds of finger strokes that can be supported by the capacitive layer is effectively infinite, especially when one considers "double tap" finger strokes or "press and hold" gestures, which are not pressed hard enough to implicate the underlying mechanical switches. For instance, to perform circular scrolling in an embodiment including 9 capacitive areas arranged as in a 3×3 format, 8 different capacitive areas might be implicated from a software processing standpoint (the edge areas, excluding the center capacitive area).

Advantageously, as shown in the various illustrative embodiments described herein, the collection of capacitive, mechanical, and topographical elements can host multiple interaction models. For instance, the capacitive surfaces can host a variety of directional gestures including circular, arced and straight finger or thumb strokes. It can be appreciated that any of these gestures can be utilized for navigating media, navigating lists, and scrolling lists, though some interaction models are better suited for certain tasks than others.

In various non-limiting embodiments, the controller of the invention can optionally glow certain color(s) using backlighting to indicate messages to the user based on what is occurring around the user from a physical proximity perspective. To the extent that a device controlled by a controller in accordance with the invention is connected to a data network, the backlighting can consider what is occurring on the network, e.g., the arrival of an email, the initiation of a connection by one of the user's friends, etc.

In one non-limiting embodiment, the controller is a media controller, and optionally includes mappings to mechanically control music as follows: play, pause, next track, fast forward, previous track, rewind via single clicking or pressing and holding.

In another non-limiting embodiment, the controller optionally includes mappings to mechanically control volume up and volume down via single clicking or pressing and holding.

In another non-limiting embodiment, the controller optionally includes mappings to mechanically navigate a user interface by going back or home via single clicking or pressing and holding.

In yet another non-limiting embodiment, the controller optionally includes mappings to a contextual "information" key that can show a context specific menu based on the user's location (or state) in the user interface or give the user contextual information about what's occurring around the user from a physical proximity perspective, or a social connection perspective.

In still another non-limiting embodiment, the controller optionally includes mappings to a directional pad for up, down, left, and right via single click or press and hold, and also optionally the controller may include mappings for an enter button.

The playback controls (e.g., play/pause, next/ff, previous/rew) and directional pad functions (up, down, left, right) can be overloaded, which can be instantiated in software based on device state.

While various physical embodiments are depicted in the drawings and described below, the controller of the invention is capable of taking on many physical instantiations as long as the controller includes a set of capacitive areas placed on top of a set of mechanical switches (including any optional topography on the capacitive areas), or includes a set of 3×3 capacitive areas set on top a set of 3×3 mechanical switches.

In another aspect of the invention, a controller can be user changeable, or personalized by a user, i.e., the elements of the controller can be user changeable, and customized to the preferences of the user. For example, the shape of the capacitive areas, or the colors of the various components can be altered in accordance with a user's preferences. In various embodiments, the invention is described in the context of a portable media center; however, it should be understood that the user interface of the invention may be used to move around a web page, navigate a map or 3-dimensional object (e.g., panning or zooming), navigate an information worker document, create drawings, navigate menus in an operating system, etc., i.e., anywhere directional input may be translated to a useful function for controlling a device, service or application.

Additionally, the devices contemplated for control by a controller of the invention include non-conventional computing devices, such as appliances. In addition, the controller may implemented in a remote control device for wireless (or wired) control of another device. For instance, any of the controllers of the invention may be implemented on a steering wheel, or as part of a universal media controller for simultaneous control of a variety of computing devices. To the extent that the controller of the invention enables a standard control mechanism that becomes immediately recognizable to a user despite the multiple interaction models (e.g., circular, arced and straight finger input, and mechanical switching) supported by the controller, the invention may be instantly used for future media device user interfaces. Thus, as the universe of devices evolves, a time to market advantage will be enabled by the invention since the design can be incorporated into future devices in a known way.

Furthermore, in another aspect, the invention enables the user to navigate collections of media and execute transport controls with a single hand. Since the user may not be able to view the input while performing other important tasks, such as driving a motor vehicle, the invention enables blind control for volume, play/pause, next/fast forward and previous/rewind in a simple and predicable manner.

As mentioned, the invention is considered to comprise any set of mechanical switches underlying a set of touch sensitive areas, thereby giving two programmable layers of functionality for control of a device, such as a media server or application. FIG. 1 illustrates this concept for a set of 3 by 3 mechanical switches 9MI provided underneath a set of 3 by 3 capacitive areas or zones 9CA. When the capacitive areas are placed over the set of mechanical inputs 9MI, i.e., when combined, a user interface 200 is formed in accordance with the invention. It will be appreciated in the below description that the capacitive zones, or areas, while depicted in exemplary embodiments as squares, can be any polygonal or even any amorphous shape, because capacitive functionality does not depend on the shape of the area.

FIG. 2A illustrates at a high level how a user can interact with both layers of a user interface integrated into a device 210 in accordance with the invention. In the top diagram of FIG. 2A, one can see that the user interaction with the capacitive layer CA layer is substantially in the plane of the surface of the CA layer, i.e., users brush the surface of the CA layer in order to impart a desired input. In contrast, as shown by the bottom diagram, one can see that the user interaction with the first layer MI layer is substantially orthogonal to the plane of the surface of the CA layer, i.e., the user presses the surface of the CA layer in order to actuate a mechanical switch underneath. As mentioned, device 210 can be a variety of devices, remote controls, etc. and is not limited to a rectangular configuration as shown for illustrative convenience.

Thus, in one embodiment of the invention, a user interface comprises 9 mechanical inputs and 9 capacitive surfaces in which the 9 capacitive surfaces are placed over the 9 mechanical inputs.

Figure 2B:
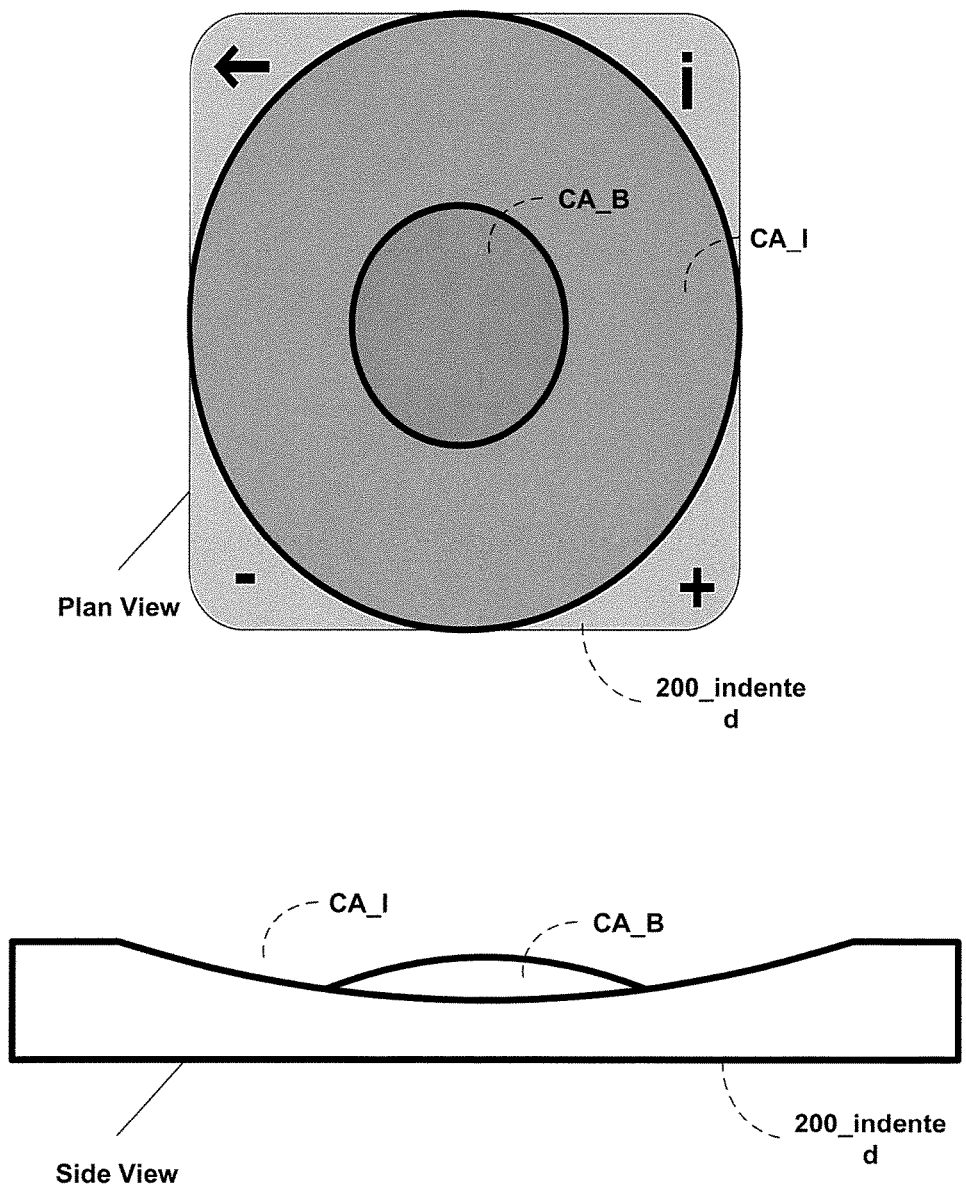
Figure 3A:
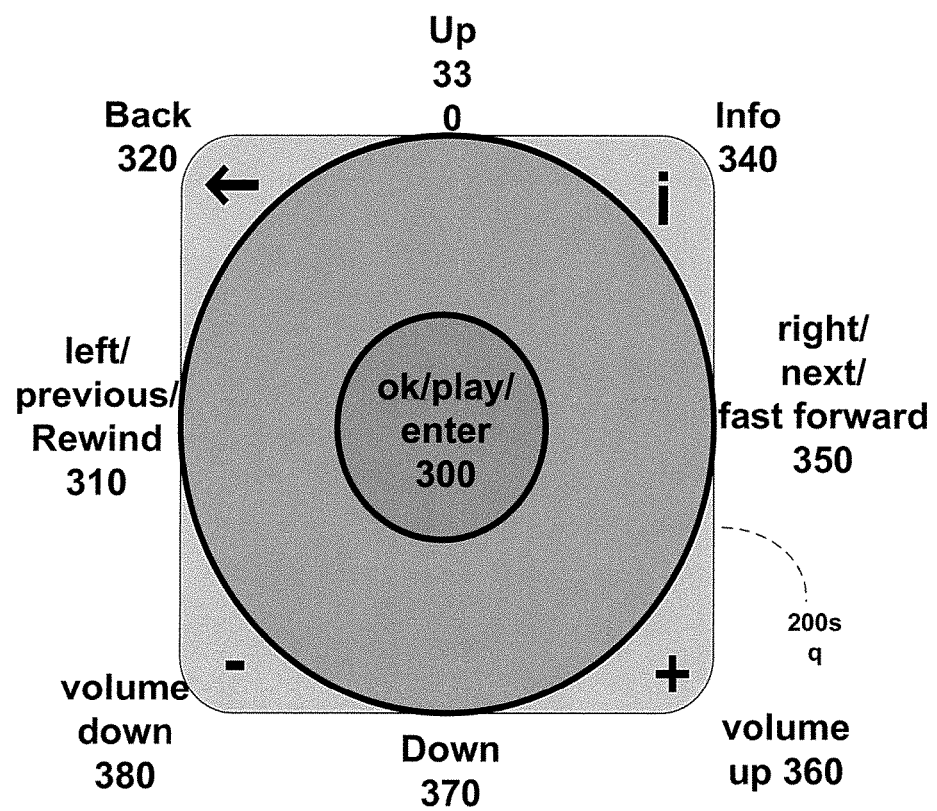

As an optional inclusion, as shown in the exemplary "bowl" topography of the plan and side views on the top and bottom of FIG. 2B, respectively, any one or more of the capacitive areas CA may include a subtle surface topography that hints at the way the user should interact with the surface. For instance, an indented region CA_I could be provided across the capacitive areas CA in order to signal a circular input by the user. This could be a circular indented region to indicate circular scrolling, or an arrow or triangular shape to indicate a direction, or the like. In addition, such topography could be, or also include, a bump CA_B to signal an underlying button, or otherwise hint at a functionality of the user interface to the user.

In another non-limiting embodiment, the second layer of the invention simulates traditional trackball input, wherein a gesture across such "trackball" translates to varying input velocities for a gesture according to traditional trackball input motions. For instance, a user's finger gesture across a center portion of a trackball implementation in the second layer may translate to a faster velocity of input than a user's finger gesture reaching the edge of the trackball implementation. As with other embodiments of the second layer of the invention, the trackball implementation may be hinted at via a 2-D or 3-D surface topography of the second layer.

Figure 4A:
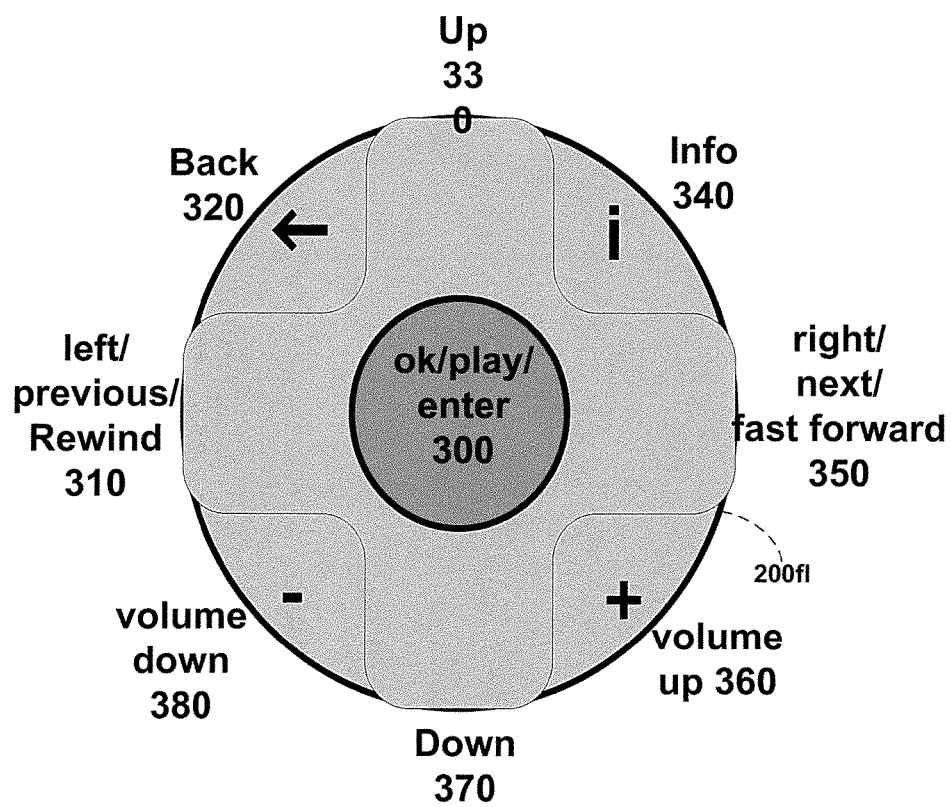

For a particular, but non-limiting embodiment of the invention, a square configuration 200*sq* of the user interface of the invention is shown in FIGS. 3A to 3D along with exemplary non-limiting control mappings for controlling a media device or application. In this embodiment, one can see that a topography on the surface of the capacitive areas shows a circular input region for capacitive scrolling. In addition to indentations and/or bumps, one can appreciate that the topography on the surface can be as simple as a different color from the rest of the capacitive layer. In addition, nine underlying mechanical inputs provide the following functions where indicated, as enumerated in FIG. 3A (and FIG. 4A below):

Center: OK/Play/Enter 300
Left: Left/Previous/Rewind 310
Upper Left: Back 320
Top: Up 330
Upper Right: Information 340
Right: Right/Next/Fast Forward 350
Lower Right: Volume Up 360
Bottom: Down 370
Lower Left: Volume Down 380

FIG. 3B illustrates a first way in which the capacitive layer of the user interface 200*sq* can be used in accordance with the invention. In this regard, by moving a finger clockwise around the circular topography of the capacitive layer, a scrolling down action can be achieved, and by moving a finger counter-clockwise around the circular topography, a scrolling up action can be achieved (or vice versa). As mentioned earlier, the circular input topography is meant to be just one example of arced input.

Optionally, any of the embodiments of the invention may include known acceleration technologies in order to scroll faster along with faster finger movement and vice versa. The capacitive layer may also include known input error filtering technologies which distinguish between accidental brushes with the capacitive layer, and intended brushes with the capacitive layer. In addition, "running starts" of finger movement with an initial velocity can optionally be distinguished from input starting from a standstill, which then accelerates to the velocity. Slipping of the finger should also be distinguished from bona fide input wherever possible. Also, various techniques can be developed to distinguish between input intended for the capacitive layer, and input for the first layer. For instance, the time after a user contacts the user interface to when a mechanical switch is actuated can be measured in order to help distinguish between such cases.

FIG. 3C illustrates a second way in which the capacitive layer of the user interface 200*sq* can be used in accordance with the invention. By moving a finger straight up or straight down, covering a pre-defined distance of the surface of the capacitive layer, initiates the functionality mapped to such movements in accordance with the invention. For instance, as shown, moving a finger straight down through the middle capacitive area of the capacitive layer may initiate a half list down scrolling action, and moving the finger straight up through the middle capacitive area may initiate a half list up scrolling action (or vice versa).

FIG. 3D illustrates a third way in which the capacitive layer of the user interface 200*sq* can be used in accordance with the invention. By moving a finger straight left or straight right, covering a pre-defined distance of the surface of the capacitive layer, initiates the functionality mapped to such movements in accordance with the invention. For instance, as shown, moving a finger straight right through the middle capacitive area of the capacitive layer may initiate a quarter timeline skip forward action, and moving the finger straight left through the middle capacitive area may initiate a quarter timeline skip backwards action (or vice versa).

In one embodiment, when a horizontal arc stroke is made by a user via the touch sensitive input pad, any media item that is being rendered, such as music or video content, skips or jumps forward in the media item a predetermined time, or percentage of the length of the media item, for each horizontal arc stroke.

Alternatively or additionally, when a vertical arc stroke is made by the user via the touch sensitive input pad, a current position in a list on display any of moves a predetermined distance up or down the list, moves to a predetermined location in the list, moves a predetermined percentage up or down the list or moves to a next alphanumeric character in the list.

Also, as mentioned, inadvertent actuation of the touch sensitive sensors can be blocked when a user moves their finger or thumb across the surface of the component to get to a mechanical part in order to actuate the mechanical part. For instance, in proximity to a press of a mechanical switch, software/firmware can determine whether the gesture was intended for the touch sensitive surface or was merely the result of brushing the touch sensitive surface to reach the mechanical switch underneath the touch sensitive surface. Accordingly, from a usability standpoint, a user may wish to make deliberate motions for certain gestures, such as circular and arc gestures. For instance, in one embodiment of the blocking of inadvertent gestures in accordance with the invention, a user begins certain gestures with "a running start" so that the software knows to treat the gesture as deliberate input to the second layer once the brush of the finger reaches or maintains a certain acceleration, velocity and/or distance.

For another non-limiting embodiment of the invention, a "flower" configuration 200*fl* of the user interface of the invention is shown in FIGS. 4A to 4D along with exemplary non-limiting control mappings for controlling a media device or application. In this embodiment, one can see that a topography on the surface of the capacitive areas shows "petals" for capacitive scrolling, though the entire surface may include capacitive functionality, e.g., for circular scrolling. In addition, nine underlying mechanical inputs provide the following functions where indicated:

Center: OK/Play/Enter 300
Left: Left/Previous/Rewind 310
Upper Left: Back 320
Top: Up 330
Upper Right: Information 340
Right: Right/Next/Fast Forward 350
Lower Right: Volume Up 360
Bottom: Down 370
Lower Left: Volume Down 380

FIG. 4B illustrates a first way in which the capacitive layer of the user interface 200fl can be used in accordance with the invention. In this regard, by moving a finger clockwise around the circle defined by the user interface 200fl, a scrolling down action can be achieved, and by moving a finger counter-clockwise around the circle defined by the user interface 200fl, a scrolling up action can be achieved (or vice versa).

FIG. 4C illustrates a second way in which the capacitive layer of the user interface 200fl can be used in accordance with the invention. By moving a finger straight up or straight down, covering a pre-defined distance of the surface of the capacitive layer, initiates the functionality mapped to such movements in accordance with the invention. For instance, as shown, moving a finger straight down through the middle capacitive area of the capacitive layer may initiate a half list down scrolling action, and moving the finger straight up through the middle capacitive area may initiate a half list up scrolling action (or vice versa). The topography of the petals of the flower helps guide a user's finger movement.

FIG. 4D illustrates a third way in which the capacitive layer of the user interface 200fl can be used in accordance with the invention. By moving a finger straight left or straight right, covering a pre-defined distance of the surface of the capacitive layer, initiates the functionality mapped to such movements in accordance with the invention. For instance, as shown, moving a finger straight right through the middle capacitive area of the capacitive layer may initiate a quarter timeline skip forward action, and moving the finger straight left through the middle capacitive area may initiate a quarter timeline skip backwards action (or vice versa). Again, the topography of the petals of the flower helps guide a user's finger movement.

It can be appreciated that FIGS. 3A to 4D are merely examples of a near infinite set of controls that include: 9 mechanical inputs, 9 discrete contiguous capacitive regions and a subtle "bowl" topography that hints at circular motion. For instance, instead of an 8-directional D-pad, a 4-directional (left, right, up, down) can be provided underneath the set of capacitive areas without the diagonals. Advantages over the status quo of any of such alternative configurations in accordance with the invention include the provision of a unified control cluster for simple and potentially iconic appearance, dedicated volume controls, capacitive scrolling augmented with mechanical D-pad discrete scrolling, greater precision and speed, as well as a simple and optional gesture set. Also, while FIGS. 3C and 3D depict horizontal and vertical straight finger actions by the user that cross the center capacitive area of the 9 capacitive areas, vertical and horizontal finger actions can also be supported that run along the left or right, or top and bottom, of the capacitive areas, respectively.

In addition, while exemplary mappings are described herein with specific actions associated therewith, such as "quarter timeline backwards," any functionality could be ascribed to such mappings. For just one example, a complex set of rules could be developed whereby if a song, or movie, is longer than 30 minutes, then "fast forward" could move the timeline 25% forward with each input, whereas if the song, or movie, is less than 30 minutes, then the timeline could be advanced just 5 minutes with each input. One can imagine an infinite set of functionality that could be mapped to the controls of the invention, depending on the underlying service, application or device.

In another aspect of the invention, the user facing portions of the user interface of the invention can be accessorized via replacement parts with different colors and shapes, enabling the opportunity for customization and personalization. Similar to Timbuk2 messenger bags in which colors of the bags may be substituted at the preference of the user, FIGS. 5A to 5G illustrate personalization of a user interface in accordance with the invention.

FIGS. 5A, 5B and 5C illustrate exemplary customizable aspects of the square embodiment 200sq of the invention. For instance, FIG. 5A illustrates how a square user interface 200sq might ship from the factory, without customization. FIG. 5B illustrates that the user can independently customize the colors (in the Figures shown as shades of grey) of the circular input portion, as well as the "ok" button in the center to provide a first level of customization. FIG. 5C illustrates another customization of the user interface 200sq in which each of the user facing regions are customized for color according to a user's preferences. Whether achieved via accessories purchased at the store that are easily interchangeable by the user, or shipped at the factory according to a user's specifications, the point is that a user can define the color, look and feel of the user interface of the invention.

FIGS. 5D, 5E, and 5F illustrate exemplary customizable aspects of the flower embodiment 200fl of the invention. FIG. 5D, for instance, illustrates an embodiment in which all components are black and not customized for color, or shade of grey, (or a user may have selected all black components). FIGS. 5E and 5F illustrate that the petals of the flower embodiment 200fl in addition to the center button have been customized or personalized according to a user's preferences in accordance with the invention.

For the avoidance of doubt, the invention is not to be considered to be limited to the flower embodiment 200fl or square embodiment 200sq. Any polygon, square, circular, or irregular shape of a user interface having a touch sensitive surface portion can be customized or personalized in accordance with the invention.

Figure 6A:
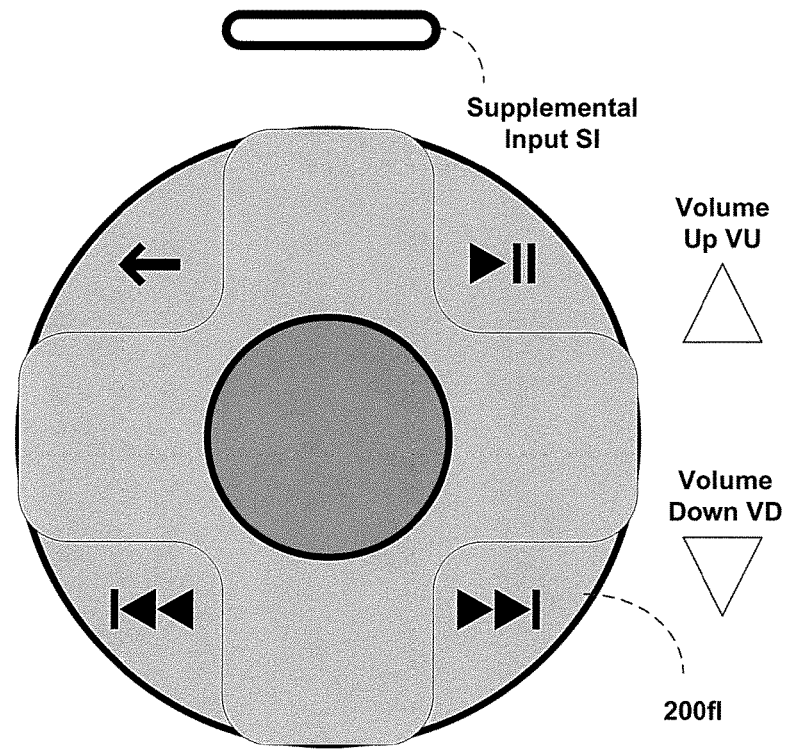
FIGS. 6A and 6B illustrate exemplary non-limiting embodiments of the invention in which supplemental input, such as a dedicated playback button, or volume button, or information button, is provided in addition to the main user interface of the invention.
Figure 6B:
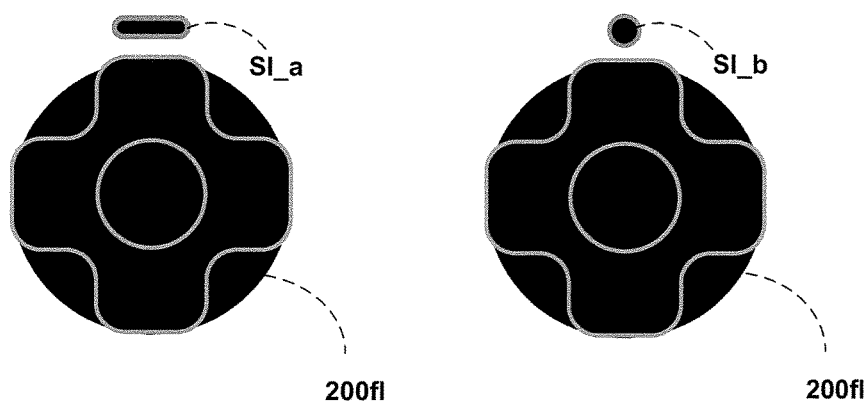

FIGS. 6A and 6B illustrate optional embodiments of the invention in which supplemental inputs may additionally be incorporated into the various user interfaces of the invention. For instance, as shown in FIG. 6A, a supplemental input SI is provided which may augment the functionality of the user interface to perform a specialized known, or surprise, functionality. For instance, "surprise" additional functionality may be a non-necessary, but nonetheless interesting and pleasing functionality improving the overall user experience. FIG. 6B illustrates an exemplary embodiment of a supplemental input in connection with the flower user interface 200fl. FIG. 6B illustrates that such functionality can be shaped according to any shape, and placed anywhere generally nearby the main user interface 200fl.

In addition, an advantage of the user interfaces of the invention is the optional provision of a permanent playback button, which does not support any other functionality. The permanent playback button may be provided as a supplemental input SI_a or SI_b as illustrated in FIG. 6B, or as part of the main user interface. In addition to a permanent playback button, the invention optionally includes a separate information button. Thus, a request for information about media, for example, can be separated from the request to play it back. As another option, dedicated volume controls are provided. The dedicated volume controls and/or permanent playback button can be provided as part of the main user interface, as described in connection with the square embodiment 200*sq* or as part of the flower embodiment 200*fl*, or as illustrated in FIG. 6A, separate dedicated volume up VU and volume down VD buttons can be provided nearby the main control.

In further optional embodiments of the invention, the supplemental input, or information button, can also be utilized as a notification mechanism. For instance, an ambient glow of the information button can serve to notify the user of a state of operation, state of connection, notification from another user, notification of an error, etc.

In other designs, the information button can be considered as a single "soft" key that is contextual to the current state. For instance, this can enable an improved interaction model when scaling the experience of the user interface of the invention to yet-to-be-developed devices, applications and services. In other alternative embodiments, the supplemental input control initiates the display of a context specific menu based on a state of the application, service or computing device being controlled, which gives the user contextual information about what devices are around the user from a physical proximity perspective.

Figure 7:
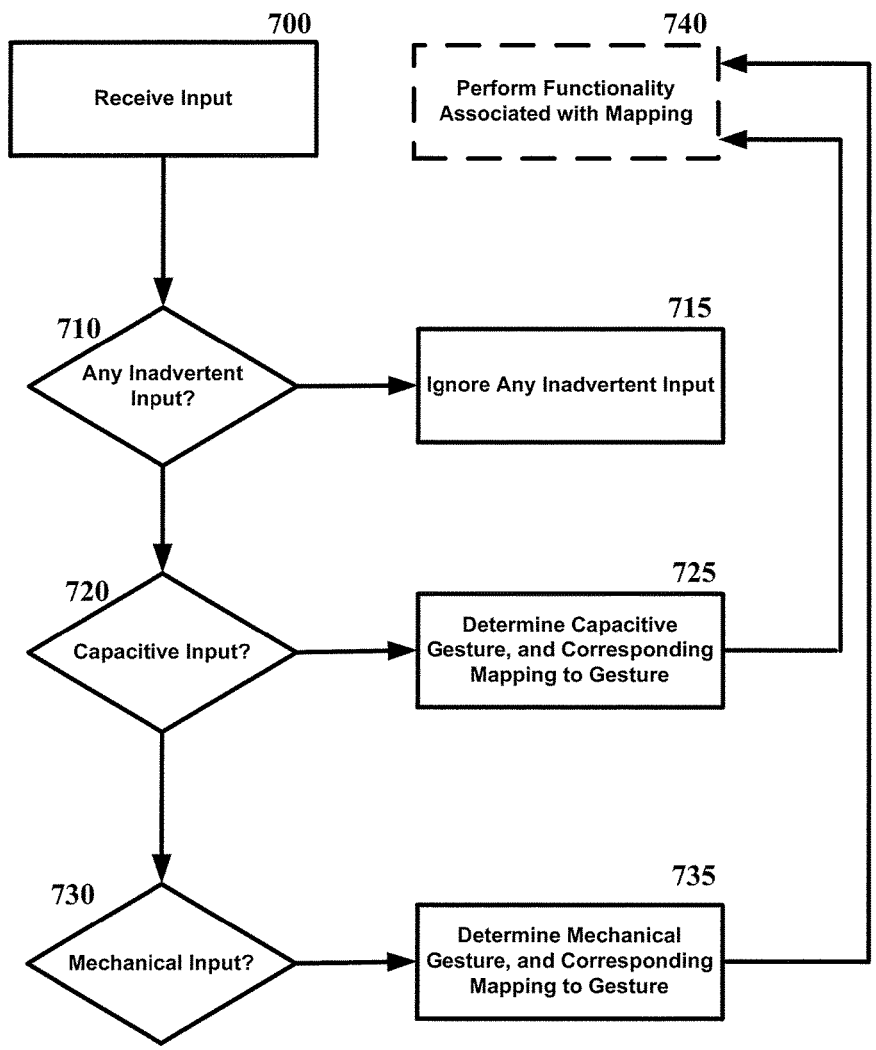
FIG. 7 is an exemplary, non-limiting flow diagram showing a model for interacting with a user interface of the invention including a capacitive layer of capacitive areas and a first layer of mechanical areas underneath in accordance with the invention.

FIG. 7 is an exemplary, non-limiting flow diagram showing a model for interacting with a user interface of the invention including a capacitive layer of capacitive areas and a first layer of mechanical areas underneath in accordance with the invention. At 700, input is received by the user interface. At 710, it is optionally determined whether or not any part of the input was inadvertent. Any inadvertent input is ignored at 715. If input remains that is regarded as intentional, at 720, it is determined whether the input applies to the capacitive layer. If so, at 725, a determination is made as to what the intended capacitive gesture is, based upon which a mapping to functionality is also determined (optionally dynamic based on the state of the device). Similarly, at 730, it is determined whether the input applies to the first layer. If so, at 735, a determination is made as to what the intended mechanical gesture is (e.g., single click, double click, press and hold, etc.), based upon which a mapping to functionality is also determined (optionally dynamic based on the state of the device). Finally, at 740, the functionality to which the input maps is performed.

Exemplary Networked and Distributed Environments

One of ordinary skill in the art can appreciate that the invention can be implemented in connection with any computer or other client or server device, which can be deployed as part of a computer network, or in a distributed computing environment, or which can be controlled by an input device. In this regard, the present invention pertains to any computer system or environment having any number of memory or storage units, and any number of applications and processes occurring across any number of storage units or volumes, which may be used in connection with controlling a computing device via a user interface in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may be controlled by a user interface of the present invention.

Figure 8:
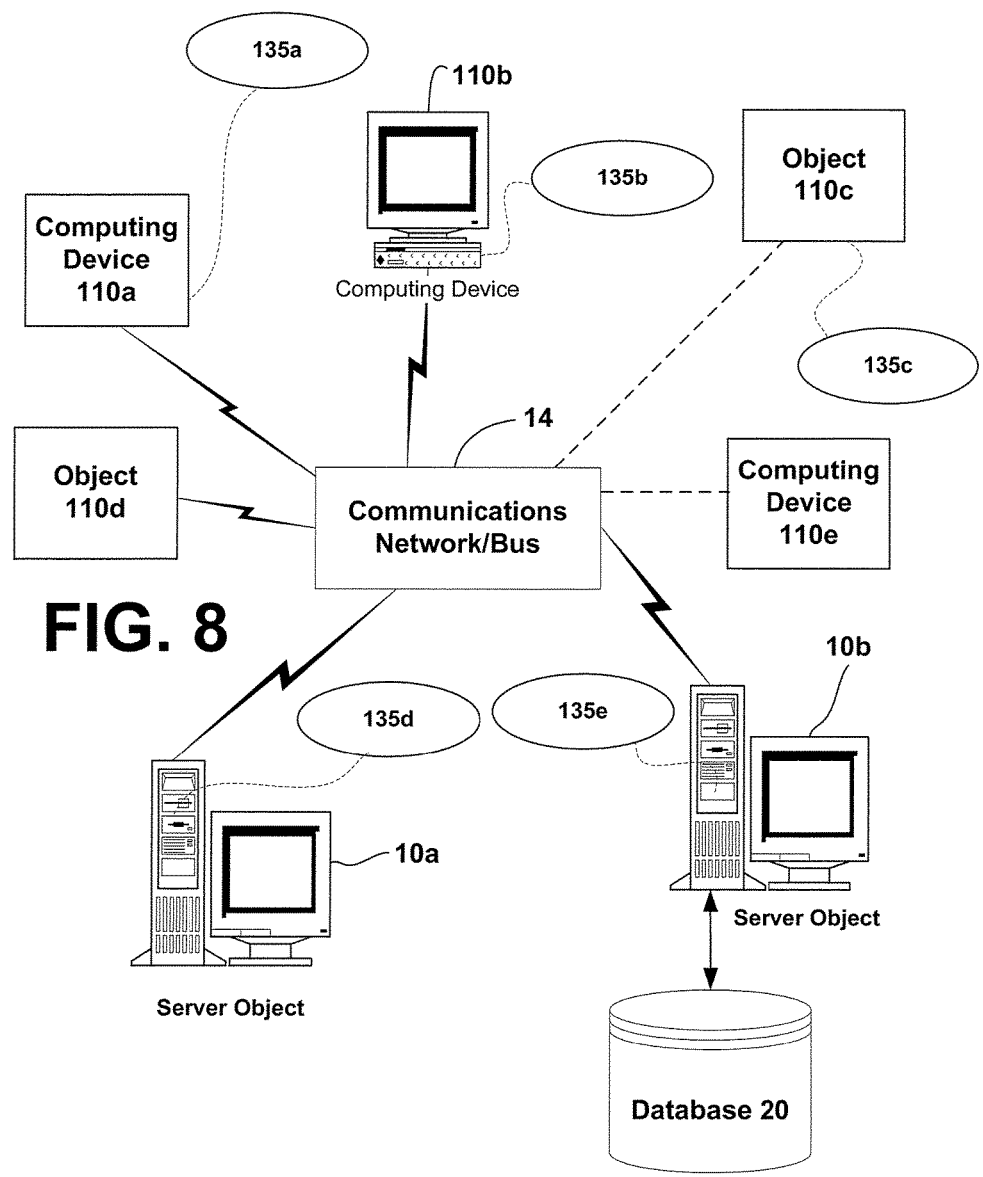
FIG. 8 is a block diagram representing an exemplary network environment in which the present invention may be implemented.

FIG. 8 provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, audio/video devices, MP3 players, personal computers, etc., any one of which may be controlled by an embodiment of a user interface in accordance with the invention. Each object can communicate with another object by way of the communications network 14. This network may itself comprise other computing objects and computing devices that provide services to the system of FIG. 8, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, suitable for use or communications with the input devices provided in accordance with the invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to controlling a computing device with a user interface according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed, processed or utilized incident to program objects and interfaces, the operation of which may be implicated by input received in accordance with the invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 8, as an example, computers 110*a*, 110*b*, etc. can be thought of as clients and computers 10*a*, 10*b*, etc. can be thought of as servers where servers 10*a*, 10*b*, etc. maintain the data that is then replicated to client computers 110*a*, 110*b*, etc., although any computer can be considered a client, a server, or both, depending on the circumstances. Any of these computing devices may be processing data or requesting services or tasks that may be implicated according to user input received by an input device in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 8 illustrates an exemplary networked or distributed environment, with server(s) in communication with client computer (s) via a network/bus, in which the present invention may be employed. In more detail, a number of servers 10*a*, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like, any of which may include or be controlled by the input devices in accordance with the present invention. It is thus contemplated that the present invention may apply to any computing device with which a human being may interact.

In a network environment in which the communications network/bus 14 is the Internet, for example, the servers 10*a*, 10*b*, etc. can be Web servers with which the clients 110*a*, 110*b*, 110*c*, 110*d*, 110*e*, etc. communicate via any of a number of known protocols such as HTTP. Servers 10*a*, 10*b*, etc. may also serve as clients 110*a*, 110*b*, 110*c*, 110*d*, 110*e*, etc., as may be characteristic of a distributed computing environment.

As mentioned, communications may be wired or wireless, or a combination, where appropriate. Client devices 110*a*, 110*b*, 110*c*, 110*d*, 110*e*, etc. may or may not communicate via communications network/bus 14, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 10*a*, 10*b*, etc. may be equipped with various application program modules or objects 135*a*, 135*b*, 135*c*, etc. and with connections or access to various types of storage elements or objects, across which files or data streams may be stored or to which portion(s) of files or data streams may be downloaded, transmitted or migrated. Any one or more of computers 10*a*, 10*b*, 110*a*, 110*b*, etc. may be responsible for the maintenance and updating of a database 20 or other storage element, such as a database or memory 20 for storing data processed or saved according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Exemplary Computing Device

Figure 9:
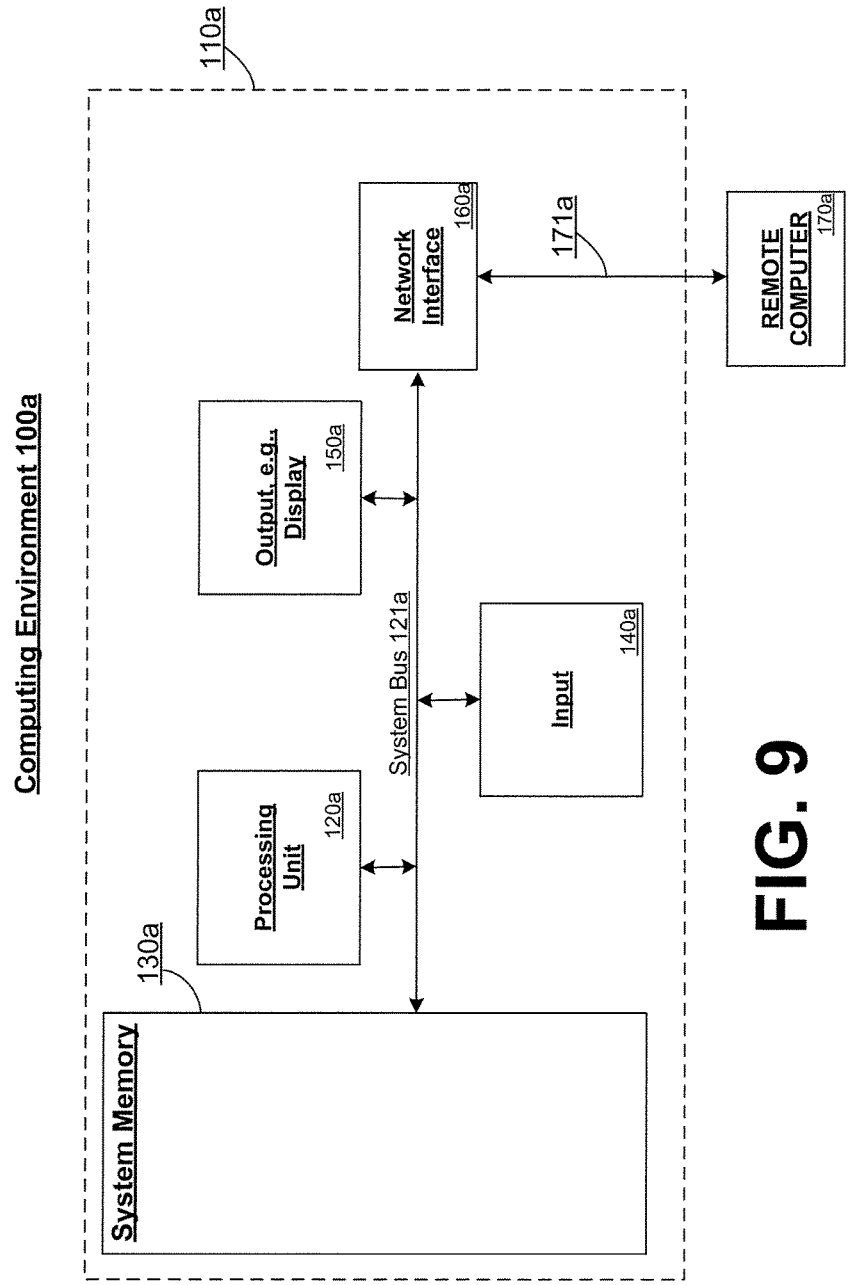
FIG. 9 is a block diagram representing an exemplary non-limiting computing system environment in which the present invention may be implemented.

As mentioned, the invention applies to any device wherein it may be desirable to include a hardware user interface for receiving input from a human being. It should be understood, therefore, that handheld, portable and other computing devices and computing objects of all kinds are contemplated for use in connection with an input device of the present invention. Accordingly, the below general purpose remote computer described below in FIG. 9 is but one example, and the present invention may be implemented with any client or portable device, whether standalone or having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the user interface component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 9 thus illustrates an example of a suitable computing system environment 100a in which the invention may be implemented, although as made clear above, the computing system environment 100a is only one example of a suitable computing environment for an input device and is not intended to suggest any limitation as to the scope of use or functionality of the invention. Neither should the computing environment 100a be interpreted as having any dependency or requirement relating to any one or combination of components illustrated in the exemplary operating environment 100a.

For the avoidance of doubt, the user interface of the invention is believed to apply to a variety of computing devices including (a) portable media players, e.g., portable music players, such as MP3 players, walkmans, etc., (b) portable computing devices, such as laptops, personal digital assistants ("PDAs"), cell phones, portable email devices (e.g., Blackberry and Windows Mobile devices), thin clients, portable gaming devices (e.g., portable PlayStation, Gameboy), etc., (c) standalone computing devices, such as personal computers ("PCs"), server computers, gaming platforms (e.g., Xbox) mainframes, etc., (d) consumer electronic devices, such as TVs, DVD players, set top boxes, monitors, displays, etc., (e) public computing devices, such as kiosks, in-store music sampling devices, automated teller machines (ATMs), cash registers, etc., (f) navigation devices whether portable or installed in-vehicle (e.g., Magellan) and/or (g) non-conventional computing devices, such as kitchen appliances, motor vehicle controls (e.g., steering wheels), etc.

With reference to FIG. 9, an exemplary remote device for implementing the invention may include a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

In addition to a user interface according to the invention, a user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 9 include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Interface Implementations

For any exchange of data among multiple computers, such as between an input device of the invention and a corresponding device or component the input device is meant to control, there are interfaces for handling the various operations on each computer that can be implemented in hardware and/or software and which operate to receive, send and/or process the data in some fashion, according to the relevant applications and services being requested or provided. To the extent that one or more interface objects may be provided to achieve or implement any portion of the input devices provided in accordance with the invention, the invention is intended to encompass all such embodiments, and thus a general description of the kinds of interfaces that might be provided or utilized when implementing or carrying out the invention, as follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 10A:
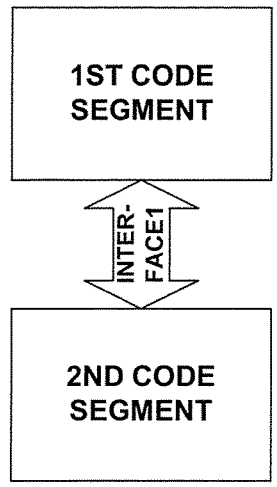
FIGS. 10A, 10B, 11A, 11B, 12A, 12B, 13A, 13B, 14A, 14B, 15A, and 15B illustrate exemplary ways in which similar interface code can be provided to achieve similar or equivalent objective(s) of any interface(s) in accordance with the invention.
Figure 10B:
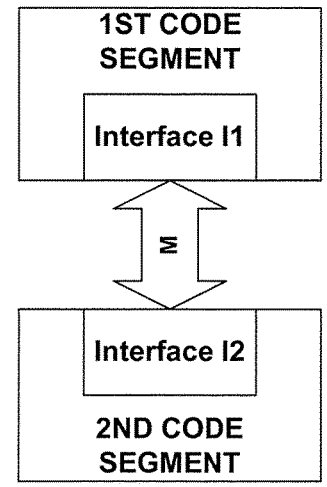

Notionally, a programming interface may be viewed generically, as shown in FIG. 10A or FIG. 10B. FIG. 10A illustrates an interface Interface1 as a conduit through which first and second code segments communicate. FIG. 10B illustrates an interface as comprising interface objects I1 and I2 (which may or may not be part of the first and second code segments), which enable first and second code segments of a system to communicate via medium M. In the view of FIG. 10B, one may consider interface objects I1 and I2 as separate interfaces of the same system and one may also consider that objects I1 and I2 plus medium M comprise the interface. Although FIGS. 10A and 10B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 10A and 10B, but they nonetheless perform a similar function to accomplish the same overall result. We will now briefly describe some illustrative alternative implementations of a programming interface.

A. Factoring

Figure 11A:
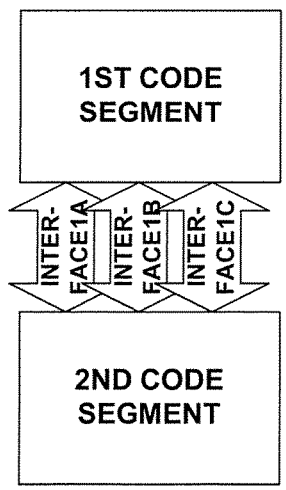
Figure 11B:
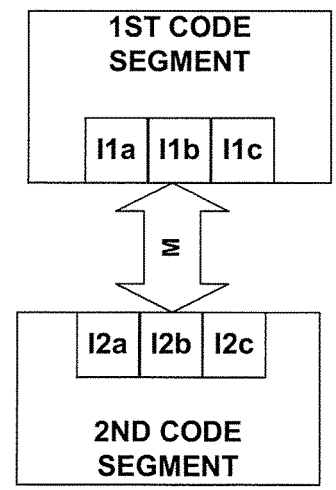

A communication from one code segment to another may be accomplished indirectly by breaking the communication into multiple discrete communications. This is depicted schematically in FIGS. 11A and 11B. As shown, some interfaces can be described in terms of divisible sets of functionality. Thus, the interface functionality of FIGS. 10A and 10B may be factored to achieve the same result, just as one may mathematically provide 24, or 2 times 2 time 3 times 2. Accordingly, as illustrated in FIG. 11A, the function provided by interface Interface1 may be subdivided to convert the communications of the interface into multiple interfaces Interface 1A, Interface 1B, Interface 1C, etc. while achieving the same result. As illustrated in FIG. 11B, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. 11A and 11B, the functional spirit of interfaces Interface1 and I1 remain the same as with FIGS. 10A and 10B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 12A:
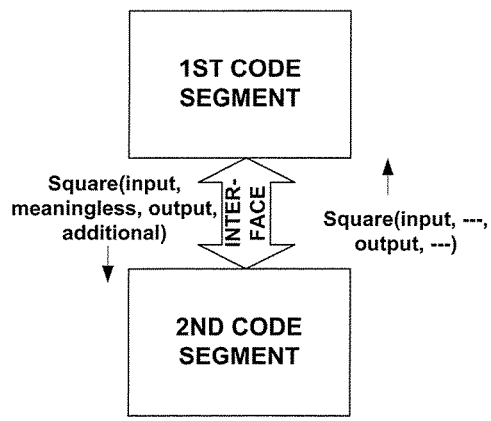
Figure 12B:
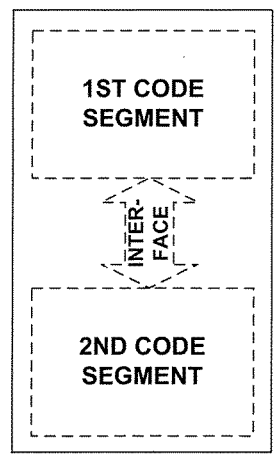

In some cases, it may be possible to ignore, add or redefine certain aspects (e.g., parameters) of a programming interface while still accomplishing the intended result. This is illustrated in FIGS. 12A and 12B. For example, assume interface Interface1 of FIG. 10A includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 12A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 12B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 13A:
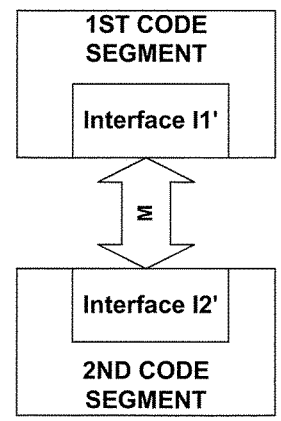
Figure 13B:
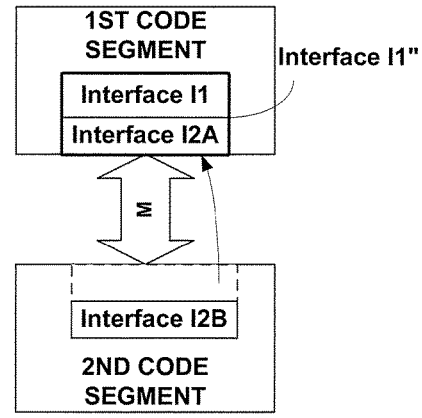

It may also be feasible to merge some or all of the functionality of two separate code modules such that the "interface" between them changes form. For example, the functionality of FIGS. 10A and 10B may be converted to the functionality of FIGS. 13A and 13B, respectively. In FIG. 13A, the previous $1^{st}$ and $2^{nd}$ Code Segments of FIG. 10A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 13B, part (or all) of interface I2 from FIG. 10B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 10B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 14A:
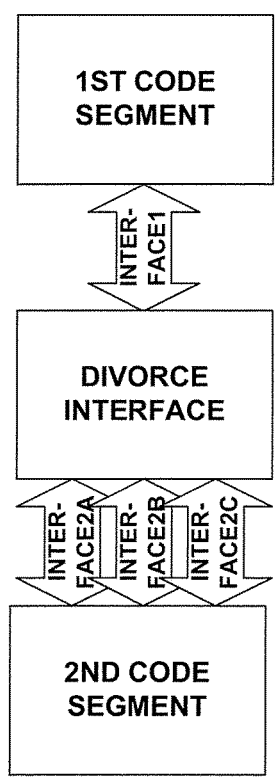
Figure 14B:
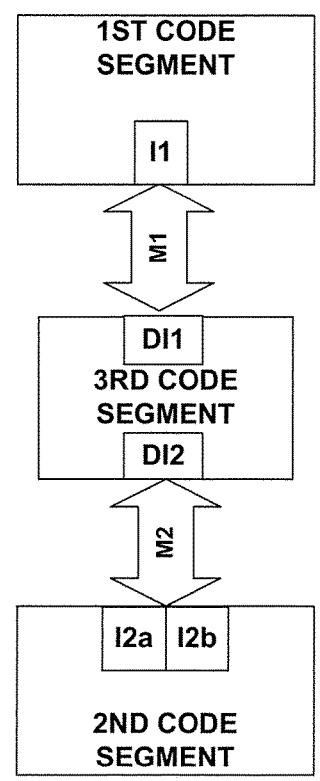

A communication from one code segment to another may be accomplished indirectly by breaking the communication into multiple discrete communications. This is depicted schematically in FIGS. 14A and 14B. As shown in FIG. 14A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 14B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 10B to a new operating system, while providing the same or similar functional result.

E. Rewriting

Figure 15A:
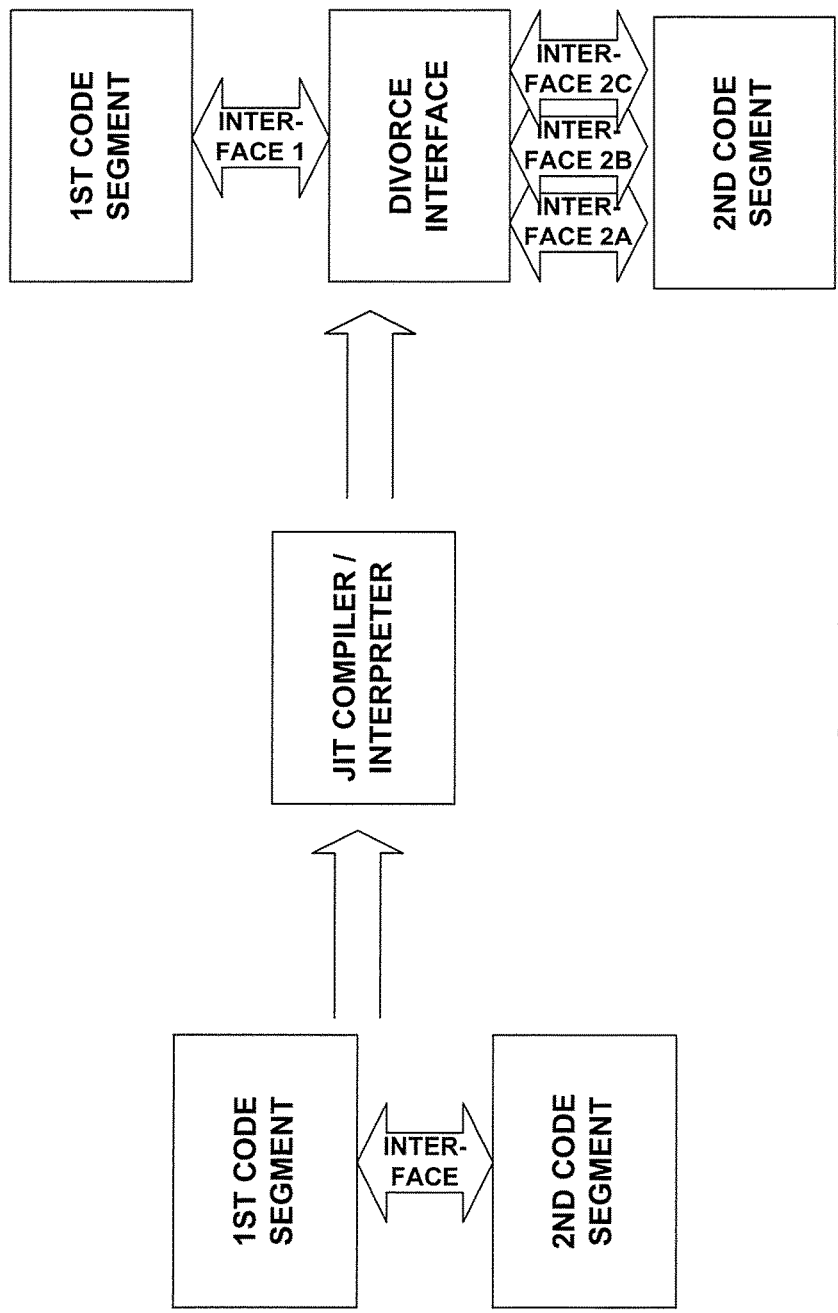
Figure 15B:
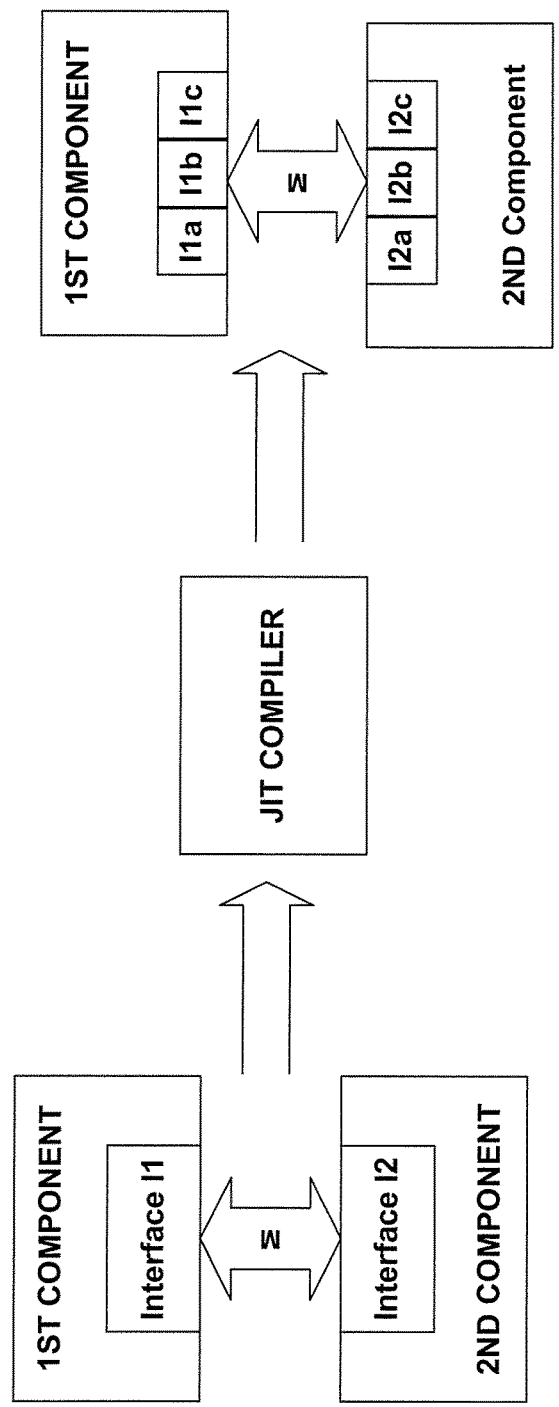

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 15A and 15B. As can be seen in FIG. 15A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 15B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 10A and 10B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use an input device provided according to the invention. The invention contemplates the use of the invention from the standpoint of an API (or other software object), either on a host device being controlled by an input device of the invention where the input device operates as a remote control, or on the input device itself. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which an input device may be utilized to control the device or system. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. FIG. 4 illustrates one way of implementing an algorithmic flow for selecting between touch sensitive and mechanical input portions in accordance with an input mode of the invention; however, one of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with the invention are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, functionality of the present invention may be implemented in or across a plurality of processing chips or devices, and storage may similarly be effected across a plurality of devices. Also, while various embodiments are described in the context of capacitive input, any touch sensitive input can be implemented. For instance, touch sensitive display screens, such as "touchscreens" found in tablet PCs, ATMs, and the like may be employed as an alternative to capacitive pads. Therefore, the present invention should not be limited to any single embodiment, but rather should be construed in breadth and scope in accordance with the appended claims.

What is claimed:

1. A system comprising:
   a user interface including:
   a first layer comprising a plurality of mechanical input controls actuatable to provide a corresponding first set of input functionality for controlling at least one of an application, service, or computing device, wherein each mechanical input control maps to an independent function; and a second layer comprising a grid of touch sensitive input control areas arranged in a flower configuration including a central touch sensitive input area surrounded by a plurality of additional touch sensitive input areas, with each touch sensitive input control area comprising at least one touch sensitive sensor, wherein:
   each touch sensitive input control area receives touch input independently from each of the other touch sensitive input control areas;
   each touch sensitive input control area of the grid of touch sensitive input control areas is on top of a corresponding mechanical input control area of the plurality of mechanical input controls; and
computer-executable instructions stored in memory and executable by a processor to receive touch input from the user interface, the computer-executable instructions configured to:
process the touch input to confirm receipt of a directional swipe gesture including consecutively-received inputs from at least two of the touch sensitive input control areas, the at least two of the touch sensitive input control areas including the central touch sensitive input area and one of the touch sensitive input control areas forming a periphery of the flower configuration; and
execute an application control action response to recognition of the directional swipe gesture.

2. The system of claim 1, wherein the grid of touch sensitive input control areas comprise at least one of a plurality of independent capacitive input control areas or a plurality of independent touchscreen control areas.

3. The system of claim 1, wherein at least one of the grid of touch sensitive input control areas comprises at least one of an indentation or a bump.

4. The system of claim 3, wherein the indentation comprises a bowl having a circular configuration.

5. The system of claim 1, wherein execution of the application control action includes altering a cursor position relative to a list displayed within an application window.

6. The system of claim 1, wherein the computer-executable instructions are configured to recognize a vertical stroke gesture and in response thereto, move a current position in a list on a display to any of: a predetermined distance up or down the list, to a predetermined location in the list, a predetermined percentage up or down the list or to a next alphanumeric character in the list.

7. The system of claim 1, further comprising at least one light that illuminates a predetermined color to indicate a state of the application, service or computing device or a notification received by the application, service or computing device.

8. A method comprising:
receiving, by a user interface, a first input from a first layer, the first layer comprising a plurality of mechanical input controls actuatable to provide a corresponding first set of input functionality for controlling at least one of an application, service, or computing device, wherein each mechanical input control maps to an independent function; and
receiving, by the user interface, a second input from a second layer, the second layer comprising a grid of touch sensitive input control areas arranged in a flower configuration including a central touch sensitive input area surrounded by a plurality of additional touch sensitive input areas, with each touch sensitive input control area comprising at least one touch sensitive sensor, wherein:
   each touch sensitive input control area receives touch input independently from each of the other touch sensitive input control areas; and
   each touch sensitive input control area of the grid of touch sensitive input control areas is on top of a corresponding mechanical input control area of the of the plurality of mechanical input controls;
processing touch input to confirm receipt of a directional swipe gesture receipt at the user interface, the directional swipe gesture including consecutively-received inputs from at least two of the touch sensitive input control areas, the at least two of the touch sensitive input control areas including the central touch sensitive input area and one of the touch sensitive input control areas forming a periphery of the flower configuration; and
executing an application control action response to recognition of the directional swipe gesture.

9. The method of claim 8, wherein the grid of touch sensitive input control areas comprise at least one of a plurality of independent capacitive input control areas or a plurality of independent touchscreen control areas.

10. The method of claim 9, wherein at least one of the grid of touch sensitive input control areas comprises at least one of an indentation or a bump.

11. The method of claim 10, wherein the indentation comprises a bowl having a circular configuration.

12. The method of claim 8, further comprising a dedicated home input control or a back input control for automatically navigating a state of the application, service or computing device to a home state, or previous state, respectively, via a single click operation or a press and hold operation.

13. The method of claim 8, further comprising a supplemental input control that initiates display of a context specific menu based on a state of the application, service or computing device to give the user contextual information about what devices are around the user from a physical proximity perspective.

14. The method of claim 8, wherein the plurality of mechanical input controls include mappings to a directional pad including up, down, left, and right functionality via a single click operation or a press and hold operation.

15. The method of claim 8, wherein the plurality of mechanical input controls include functionality mappings that dynamically change based on a state of the application, device or service.

16. One or more memory devices encoding computer-executable instructions comprising:
receiving, by a user interface, a first input from a first layer, the first layer comprising a plurality of mechanical input controls actuatable to provide a corresponding first set of input functionality for controlling at least one of an application, service, or computing device, wherein each mechanical input control maps to an independent function; and
receiving, by the user interface, a second input from a second layer, the second layer comprising a grid of touch sensitive input control areas arranged in a flower configuration including a central touch sensitive input area surrounded by a plurality of additional touch sensitive input areas, with each touch sensitive input control area comprising at least one touch sensitive sensor, wherein:
   each touch sensitive input control area receives touch input independently from each of the other touch sensitive input control areas;

each touch sensitive input control area of the grid of touch sensitive input control areas is on top of a corresponding mechanical input control area of the of the plurality of mechanical input controls; and processing touch input to confirm receipt of a directional swipe gesture receipt at the user interface, the directional swipe gesture including consecutively-received inputs from at least two of the touch sensitive input control areas, the at least two of the touch sensitive input control areas including the central touch sensitive input area and one of the touch sensitive input control areas forming a periphery of the flower configuration; and executing an application control action response to recognition of the directional swipe gesture.

17. The one or more memory devices of claim 16, wherein the grid of touch sensitive input control areas comprise at least one of a plurality of independent capacitive input control areas or a plurality of independent touchscreen control areas.

18. The one or more memory devices of claim 16, wherein at least one of the grid of touch sensitive input control areas comprises at least one of an indentation or a bump.

19. The one or more memory devices of claim 18, wherein the indentation comprises a bowl having a circular configuration.

20. The one or more memory devices of claim 16, wherein the directional gestures are utilized at least for navigating a list on a display associated with the application, service or computing device.

21. The user interface of claim 1, wherein the second layer further comprises:

at least one touch sensitive input control area of the grid includes a second layer configured to simulate a trackball, wherein a finger gesture when crossing a center portion of the second layer translates to a greater velocity input than when reaching an edge of the second layer and not crossing the center portion.

22. The method of claim 8, wherein at least one of the touch sensitive input control areas includes a second layer configured to simulate a trackball, wherein a finger gesture when crossing a center portion of the second layer translates to a greater velocity input than when reaching an edge of the second layer and not crossing the center portion.

23. The one or more memory devices of claim 16, wherein at least one of touch sensitive input control area of the grid includes a second layer configured to simulate a trackball, wherein a finger gesture when crossing a center portion of the second layer translates to a greater velocity input than when reaching an edge of the second layer and not crossing the center portion.

* * * * *